(12) United States Patent
Robinson et al.

(10) Patent No.: US 8,789,583 B2
(45) Date of Patent: Jul. 29, 2014

(54) ELECTROMAGNETIC TREATMENT OF CONTAMINATED MATERIALS

(75) Inventors: John Robinson, Nottingham (GB); Sam Kingman, Nottingham (GB); Colin Snape, Nottingham (GB); Michael Bradley, Gravesend (GB); Steven Bradshaw, Matieland (ZA)

(73) Assignee: The University of Nottingham, Nottingham (GB)

( * ) Notice: Subject to any disclaimer, the term of this patent is extended or adjusted under 35 U.S.C. 154(b) by 965 days.

(21) Appl. No.: 12/514,983

(22) PCT Filed: Nov. 14, 2007

(86) PCT No.: PCT/GB2007/004344
§ 371 (c)(1),
(2), (4) Date: Apr. 29, 2010

(87) PCT Pub. No.: WO2008/059240
PCT Pub. Date: May 22, 2008

(65) Prior Publication Data
US 2010/0200300 A1    Aug. 12, 2010

(30) Foreign Application Priority Data
Nov. 14, 2006    (GB) .................................. 0622595.7

(51) Int. Cl.
*E21B 36/00*    (2006.01)
*E21B 21/01*    (2006.01)
*E21B 21/06*    (2006.01)
*E21B 43/34*    (2006.01)

(52) U.S. Cl.
USPC ........ 166/247; 166/75.12; 166/248; 166/267; 166/302; 175/66; 175/207

(58) Field of Classification Search
None
See application file for complete search history.

(56) References Cited

U.S. PATENT DOCUMENTS 5,487,873 A    1/1996    Bridges
6,039,774 A *  3/2000    McMullen et al. ......... 48/102 A

FOREIGN PATENT DOCUMENTS

WO    9314821    8/1993

OTHER PUBLICATIONS

Separation and Purification Technology; H. Shang, C.E. Snape, S.W. Kingman, J.P. Robinson; vol. 49, Apr. 1, 2006, pp. 84-90; retrieved online from www.sciencedirect.com.
International Search Report for PCT/GB2007/004344.

* cited by examiner

*Primary Examiner* — Zakiya W Bates
(74) *Attorney, Agent, or Firm* — Nicholas A. Kees; Godfrey & Kahn, S.C.

(57) ABSTRACT

A method for separating hydrocarbon content from a hydrocarbon contaminated matrix. The method includes controlling water content of a feed material having the hydrocarbon contaminated matrix; continuously conveying the feed material into a treatment cavity; exposing the feed material in a treatment area of the treatment cavity to microwave radiation arranged to cause rapid heating of at least a portion of the water content to form steam, wherein the rapid steam formation results in thermal desorption of at least a portion of the hydrocarbon content from the matrix; and continuously removing the treated matrix from the treatment cavity.

20 Claims, 17 Drawing Sheets (a) Roller diameter 20 mm

ELECTROMAGNETIC TREATMENT OF CONTAMINATED MATERIALS

The invention relates to a process and apparatus for the treatment of contaminated materials, for example, hydrocarbon contaminated matrices, using electromagnetic radiation. The invention relates particularly, but not exclusively, to the continuous microwave treatment of oil contaminated drill cuttings.

Electromagnetic radiation includes, inter alia microwave and radio frequency radiation, as well as other frequencies of radiation, such as infra red or visible light.

'Hydrocarbon contaminated matrix', or 'oil contaminated matrix' is used herein to mean a matrix, often of solid materials, for example rock chippings, soil, sludge, filter cake, etc, which comprises a water content and which is contaminated with hydrocarbons. The hydrocarbons could be any natural or synthetic hydrocarbon, such as natural or synthetic oils. The hydrocarbons might be naturally present in the rock. An example of an oil contaminated matrix is oil contaminated drill cuttings. Drill cuttings are made up of a mixture of rock fragments, oil and water, and are produced in significant quantity during the exploration and production of oil and gas. Depending on the hardness of the rock being drilled, a bore can be drilled at a rate of between 30 and 50 feet per hour. Bores are often 3 to 5 km in depth, and can be 8¾ inches, 15 inches or 17¼ inches in diameter. It is estimated that the 56 sites in the North Sea alone produce over a million tons of waste drill cuttings per year.

During drilling for oil and/or gas, a 'drilling mud' is pumped to the drill bit, which acts as a lubricant, as well as a coolant and a means to transport drill cuttings to the surface. Drilling muds are generally oil based, especially in difficult drilling conditions such as those experienced in the North Sea. In less challenging geological areas, water based or synthetic drilling muds may be used.

The oil contaminate in the drill cuttings is mainly derived from the drilling mud itself, rather than naturally occurring oil, and might comprise 5-30% by weight of the cuttings. Whilst the use of water based muds causes less issues in the final disposal of the drill cuttings, as such cuttings have little oil content, oil based muds are necessary when the geological situation demands it, for example where the rock is hard, or where complicated bores are required to be drilled.

Oil contaminated drill cuttings (sometimes referred to herein as OCDC) produced on off shore oil or gas drilling rigs were historically disposed of by dumping them into the sea. However, drill cuttings now pose a more difficult disposal problem on rigs, because environmental regulations often mean that they cannot be discharged into the sea. Regulations vary from country to country. For example, current UK regulations require less than 1% oil by weight in drill cuttings for sea disposal.

The majority of drilling platforms have little storage capacity, so once sea disposal has ceased the majority of material will have to be transported to shore for disposal. Transportation of waste to shore is expensive and can be difficult and dangerous in poor weather. Storage of large amounts of waste on rigs for extended periods is not possible, because once a rig's buffer storage capacity has been reached it is necessary to stop drilling until cuttings can be transported to shore. Stopping drilling is expensive.

On shore the contaminated drill cuttings are also subject to legislative control regarding disposal in land based environments such as landfill sites. It is therefore often necessary to process the OCDC on land to reduce the concentration of oil contamination or to render the residual oil immobile so that it does not cause environmental harm.

We consider it to be desirable to treat oil contaminated drill cuttings in-situ on the oil production/exploration platform, so as to reduce the amount of oil contaminant, preferably to a level that would allow the disposal of the drill cuttings into the sea. However, this poses a problem of providing treatment apparatus which does not take up too much of the limited space available on the rig.

Whilst the present invention has been made in the context of off-shore drilling platforms, and the invention has especial significance there, it will be appreciated that it could be used on land, and for purposes other than removing oil from a substrate, for example treating contaminated soil, or treating polluted land.

Furthermore, oil based drilling muds are themselves relatively high value materials. We consider it desirable to provide a process and apparatus that is able to recover at least a portion of used oil based drilling mud from drill cuttings. The more oil that can be recycled, the less needs to be shipped out to and stored on the rig itself, meaning rigs can run longer without needing to re-supply and at lower cost.

The most common treatment processes currently in use are based on thermal treatment. Such processes include incineration, thermal desorption or processes where mechanical energy is used to generate heat. In such processes it is normal to heat cuttings to a temperature sufficient to remove any water present in the cuttings, and then raise the temperature until oil contaminant within the cuttings is burnt or boiled away.

According to a first aspect of the invention we provide a method for separating a hydrocarbon content from a hydrocarbon contaminated matrix, comprising the steps of: controlling a water content of a feed material comprising the hydrocarbon contaminated matrix; continuously conveying the feed material into a treatment cavity; exposing the feed material in a treatment area of the treatment cavity to electromagnetic, preferably microwave, radiation arranged to cause rapid heating of at least a portion of the water content to form steam, wherein the rapid steam formation results in thermal desorption of at least a portion of the hydrocarbon content from a treated material; and continuously removing the treated material from the treatment cavity.

Rather than a method of separating or extracting a hydrocarbon content from a hydrocarbon contaminated matrix, we may provide a method of reducing the hydrocarbon content in a hydrocarbon contaminated matrix.

The hydrocarbon may be oil, whether natural or synthetic.

It has been proposed in laboratory studies to use microwave energy to reduce oil levels in oil contaminated drill cuttings [Shang et al. 'Treatment of Oil-Contaminated Drill Cuttings by Microwave Heating in a High-Power Single-Mode Cavity', Ind. Eng. Chem. Res. 2005, 44, 6837-6844], [Shang et al. 'Microwave treatment of oil-contaminated North Sea drill cuttings in a high power multimode cavity', Separation and Purification Technology, 2006, 49, 84-90].

In these studies precise knowledge of electromagnetic field strength in laboratory cavities enabled test samples to be placed in the position of maximum field strength. However the heating of the cutting is localised in the machine, and a significant temperature gradient formed across the cavity leading to the uneven treatment of oil. The system was not really usable satisfactorily.

The design of a useful continuous microwave treatment system is not described in prior art. We have appreciated that the use of such a system is advantageous over other heating methods for a number of reasons, including selective heating specifically to lessen the oil level, as opposed to the heating of the entire sample. This permits contaminant removal at reduced bulk temperatures, and consequential energy savings.

One embodiment of the invention relates to a process that permits effective microwave treatment of OCDC on a continuous basis (as opposed to a batch basis) where the designs of a material feed system, material handling system and treatment cavity integrate to ensure that contaminated material is consistently treated. The materials output from the treatment process in some embodiments comprise a steam/vapour from which, optionally, oil can be recycled back into the drilling mud, and a solid phase with a low oil loading that can be disposed of or reused as required.

Furthermore, apparatus designed in accordance with the invention can be arranged to have a small 'footprint', that is, to take up a small amount of space on a rig or in other situations with limited space. The apparatus can fit into an ISO container.

A water content of the oil contaminated matrix, or of the bulk feed material (e.g. OCDC) may be measured. The water content of the feed material may be controlled by blending a material of known water content with the oil contaminated matrix. The material of known water content preferably comprises treated material (with reduced oil content, and possibly reduced water content, in comparison with the untreated feed material).

The water content of the feed material is controlled such that the dielectric properties of the feed material as a bulk composite substance are in the range $\in'$=2.5 to 4.5 or 0.1 to 20 and $\in''$=0.1 to 10. Preferably the bulk dielectric properties of the feed material are $\in'$=3.5 and $\in''$=0.5. Suitable dielectric properties are required in order to produce the effect of rapid water heating. The material must have a suitably high absorbance to be heated in an electric field, but not so high that penetration depth is limited. However, the values are frequency dependent, and so vary depending on the radiation applied. Those quoted above are for microwaves.

The microwave radiation may have a power of at least 1 kW, optionally at least 5 kW, and may have a power in the range 5 kW to 1 MW. In an industrial application, a suitable power might be least 50 kW, or preferably 100 kW to 500 kW, as lower powers would require higher residence times. Powers of between 500 kW and up to approx. 1 MW might also be used. When power is referred to, this is the TOTAL power of a system, and covers the use of a number of lower power parallel units.

The microwave radiation may have a frequency of 896 MHz, or thereabouts. The precise frequency chosen to be used is dependant to some extent to the geographical region where the process is being operated. The useable range may extend from 1 MHz to 2.45 GHz. Regulations control the use of frequencies to be used, but it may be that in remote areas (e.g. on an oil rig in the sea) regulations reserving certain frequencies for specific purposes/specific legal entities may not apply. Ultimately the choice of frequency used is related to the required penetration depth and the dielectric properties of the material to be treated.

The feed material may be exposed to the microwave radiation for a length of time in the range 0.1 to 2 seconds (this is typical to OCDC) or from 0.1 to 10 seconds in a more general treatment of contaminated materials sense, so as to rapidly heat up the water content of the matrix (e.g. the water content of, or surrounding, the rocks of the OCDC).

The method may further comprise the step of passing or sweeping inert gas though the treatment cavity substantially to remove vapours from a treatment area, the vapours having been produced during exposure of the feed material to the microwave radiation. By 'inert' we mean a gas which will not react with the feed material under the conditions present in the treatment area. Examples of suitable gases are nitrogen, steam, as well as a noble gas.

According to a second aspect of the invention we provide an apparatus for reducing a contaminant, e.g. hydrocarbon, content in a hydrocarbon (or other contaminant) contaminated matrix, the apparatus comprising a microwave or other electromagnetic wave treatment cavity having a material treatment area, a material feeder arranged in use continuously to convey a feed material into and out of the treatment area, and a microwave (or other electromagnetic wave) emitter arranged in use to expose feed material in the treatment area to microwave or other electromagnetic radiation in order to cause rapid heating of at least a portion of a water content of the hydrocarbon or other contaminant contaminated matrix to form steam so as to remove at least a portion of the hydrocarbon or other contaminant content from the matrix.

Rather than a method of separating or extracting a hydrocarbon content from a hydrocarbon contaminated matrix, we may provide a method of reducing the hydrocarbon content in a hydrocarbon contaminated matrix.

The hydrocarbon may comprise oil, whether natural or synthetic.

The treatment cavity preferably comprises an applicator having an inlet and an outlet, and the treatment is located between the inlet and the outlet. The applicator may be a tunnel applicator.

The shape of the applicator is preferably arranged to improve the uniformity of an electric field which is formed within the treatment area when the apparatus is in use treating a material. It is preferred to use a feed material having a known or even a controlled water content. The shape of the applicator may be optimised using knowledge of the water content of the bulk feed material.

The applicator may comprise a waveguide arranged to direct microwave radiation from the microwave emitting means into the treatment area. The applicator may comprise a self cancelling step. The applicator may further comprise chokes arranged to resist the escape of microwave radiation from the inlet and outlet.

The material feeder may comprise a trough conveyor for conveying feed material through the treatment cavity. The conveyor may be spaced from a base wall of the treatment cavity.

The material feeder may comprise a material blender arranged to mix additional material, e.g. dry or drier material, into the contaminated material to produce a feed material of controlled water content. The additional, dry or drier, material may comprise treated material (material that has been treated by the apparatus).

The apparatus may further comprise a gas flow, or gas circulation mechanism arranged in use to pass inert gas through the treatment area. The gas flow mechanism may circulate inert gas through the treatment area and recover and re-circulate inert gas. The gas flow or circulation mechanism may be arranged to introduce inert gas to the applicator (e.g. tunnel applicator) at the inlet and at the waveguide of the applicator. The gas flow or circulation mechanism may be arranged to remove gas from the applicator through perforations in a wall of the applicator (e.g. tunnel applicator).

The apparatus may further comprise a separator adapted to separate at least some vapour produced in the treatment area from the inert gas.

In another aspect of the invention we have realised that it is desirable to provide a method and apparatus for removing vapours generated within a microwave (or other electromagnetic radiation) cavity from the microwave cavity. Such vapours might damage the microwave cavity through the formation of a plasma if not removed.

According to a third aspect of the invention we provide a method of microwaving a substrate comprising removing vapours from a treatment area of a microwave treatment cavity.

The method may comprise the steps of: exposing a sample within the treatment area to microwave radiation so as to produce gas and/or vapour; and passing a purging gas, optimally inert gas, through the cavity to remove vapours from the treatment area.

Alternatively/additionally we may apply a low pressure to the cavity and suck out vapours.

The sample may be an oil contaminated matrix.

The purging gas is preferably steam or nitrogen. By "inert gas" is meant a gas which does not react significantly with the sample. The gas may also not react significantly with the extracted vapour.

The gas may be swept through the cavity and the sample exposed to microwave radiation simultaneously or substantially simultaneously. The gas may be swept through the cavity after the sample is exposed to microwave (or other) radiation. This includes beginning sweeping gas through the cavity as the sample is exposed to radiation, and continuing sweeping gas through the cavity after the sample is exposed to radiation.

According to a fourth aspect of the invention we provide microwave (or other electromagnetic wave) application apparatus comprising a microwave treatment cavity and a gas purging system arranged in use to pass a purging gas through the cavity to remove from a treatment area vapours produced during the application of microwaves (or other electromagnetic waves) to a substrate.

According to a fifth aspect of the invention we provide a method of microwaving a feed material in a microwave cavity comprising controlling the water content of the feed material.

The method may comprise measuring or determining a water content of an oil contaminated material; and
 adding a material of a known water content to the oil contaminated material, such that the feed material produced has a controlled water content.

According to a sixth aspect of the invention we provide a method for reducing an oil content of an oil contaminated matrix, comprising the steps of:
 controlling dielectric properties of a feed material comprising the oil contaminated matrix;
 continuously conveying the feed material into a treatment cavity;
 exposing the feed material in a treatment area of the cavity to microwave radiation arranged to cause rapid heating of at least a portion of a water content of the feed material to form steam, wherein the rapid steam formation results in thermal desorption of at least a portion of the oil content from the matrix; and
 continuously removing the treated matrix from the treatment cavity.

The dielectric properties may comprise a water content.

An embodiment of the invention will now be described, by way of example only, with reference to the accompanying drawings, in which.

Figure 8:
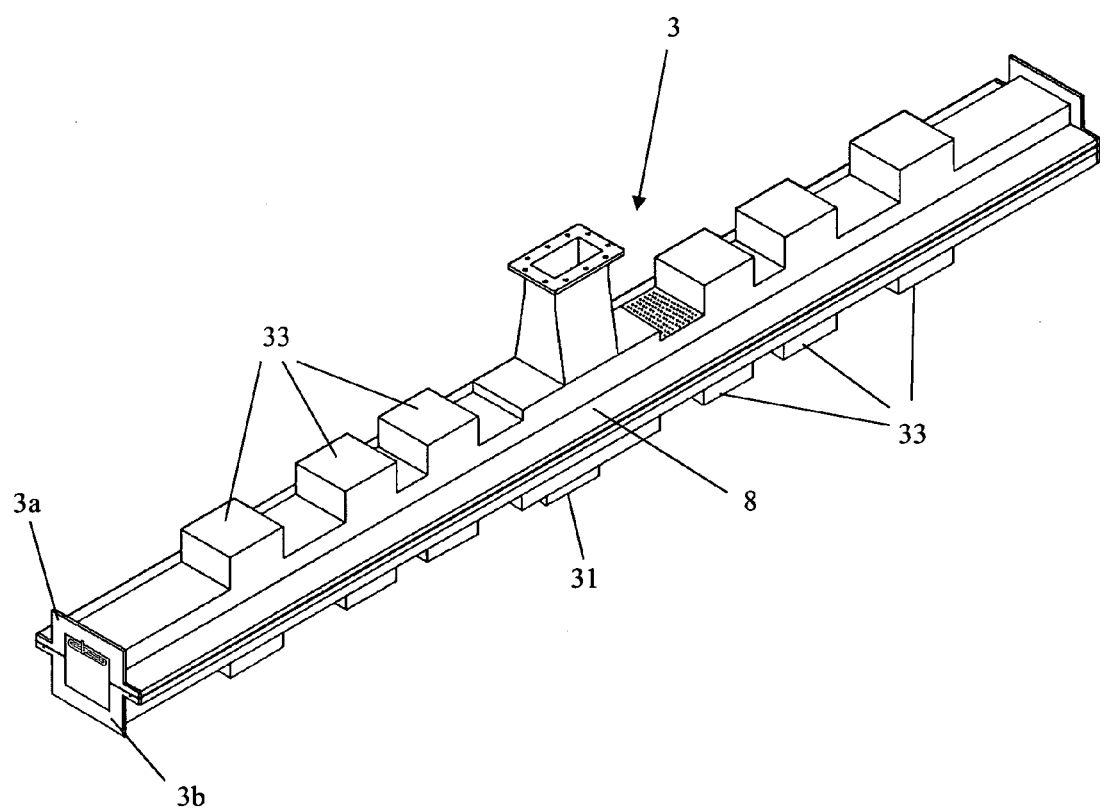
FIG. 8 shows a perspective view of a microwave treatment cavity.
Figure 8A:
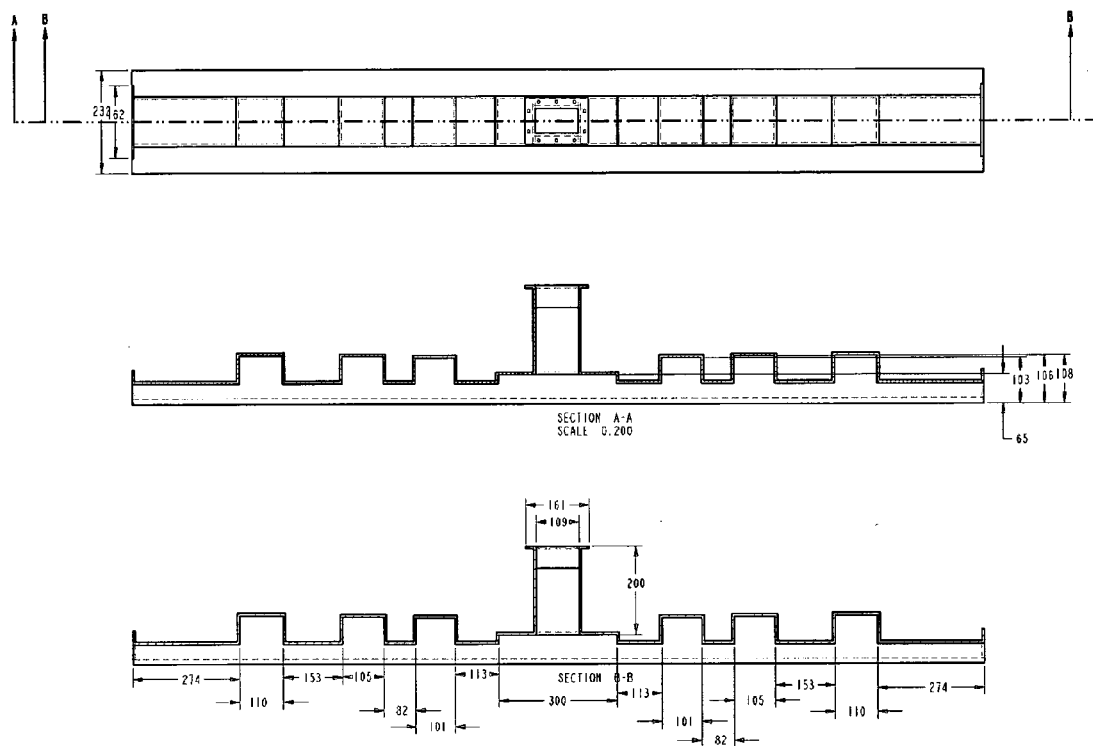
Figure 8B:
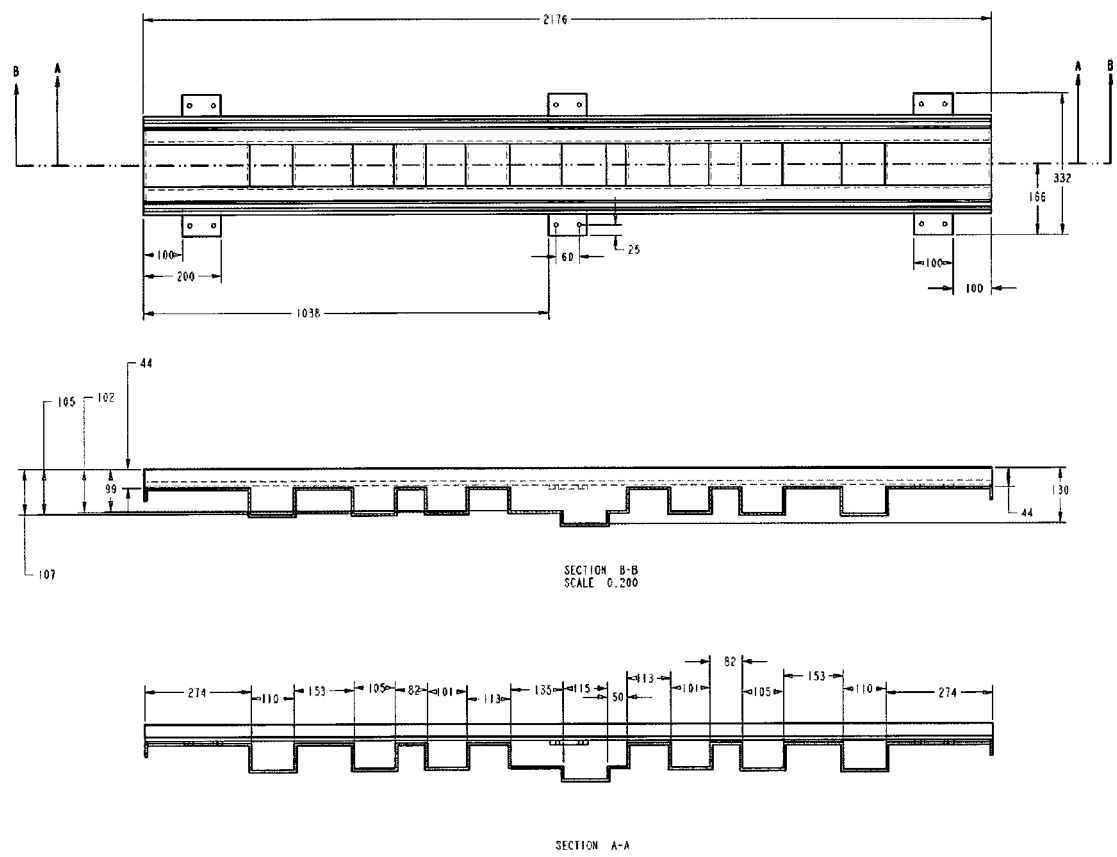
Figure 9:
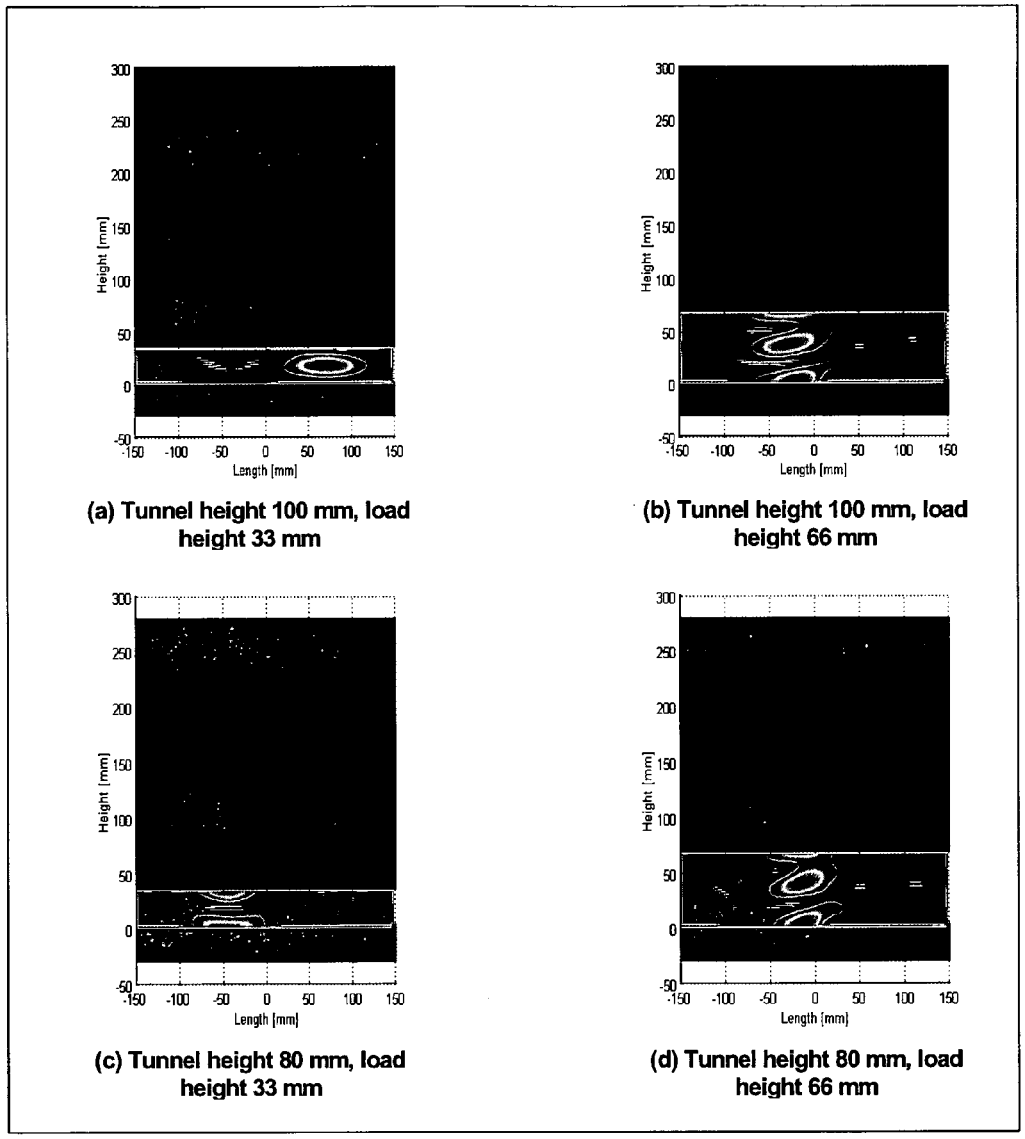
Figure 10A:
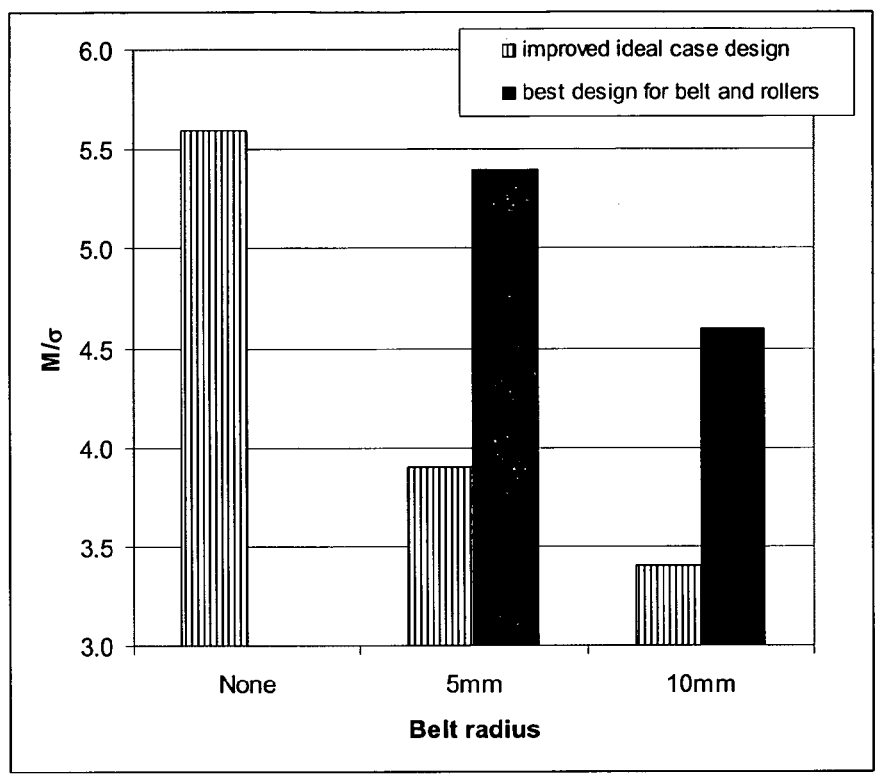
Figure 10B:
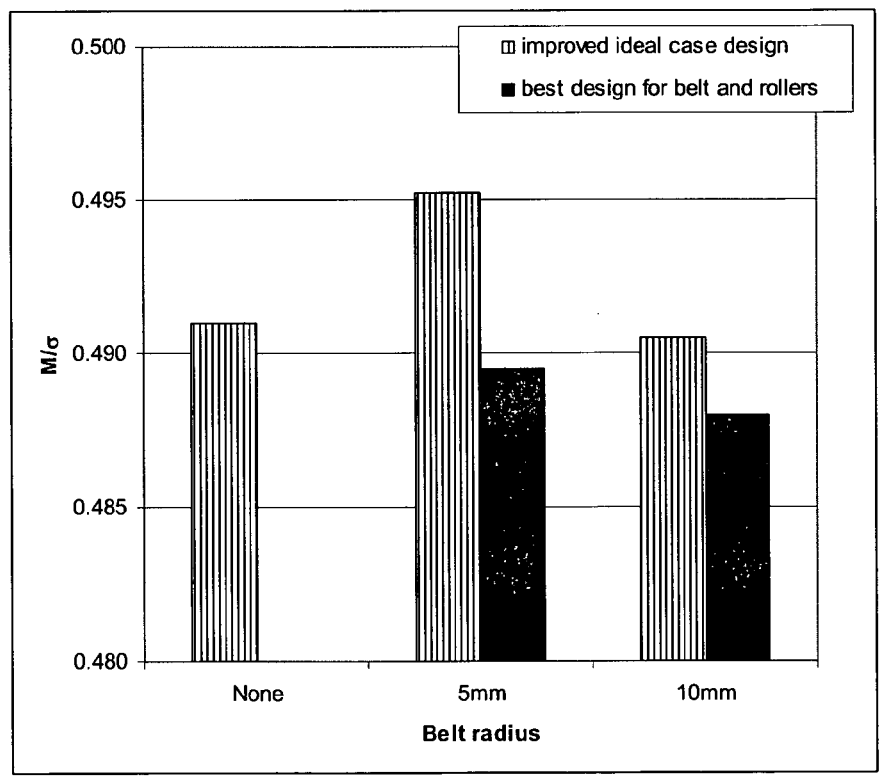
Figure 11:
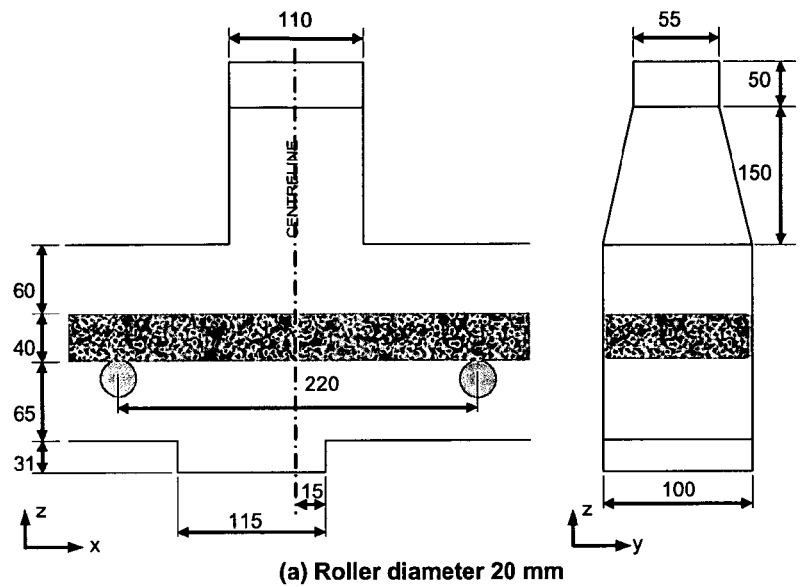
Figure 12:
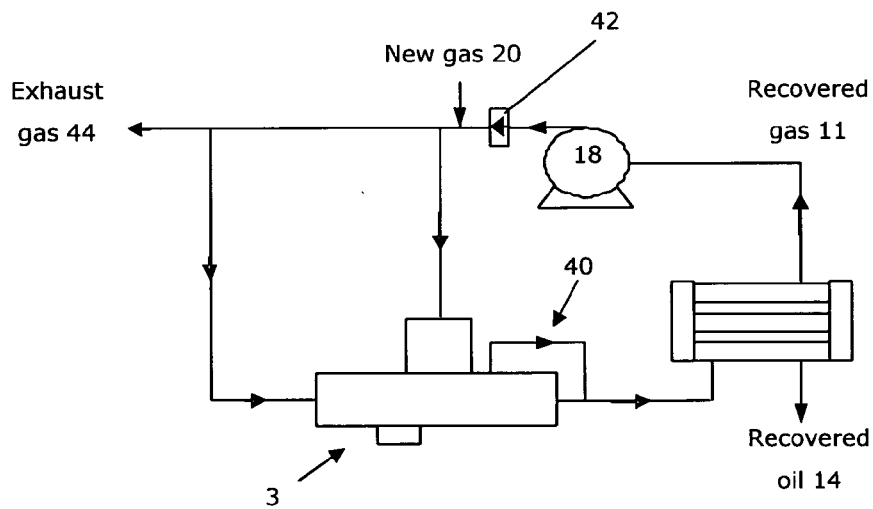
Figure 13:
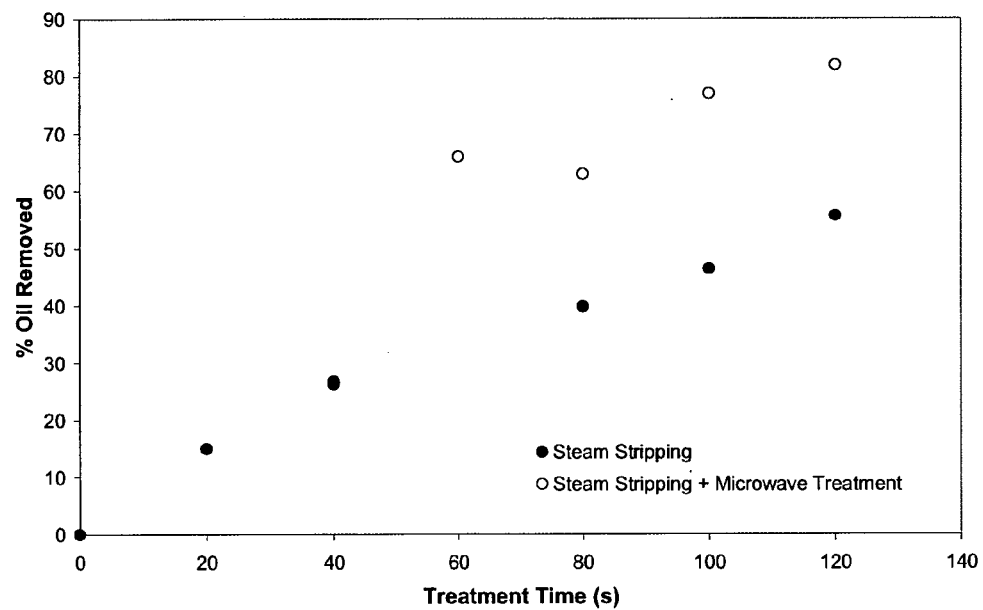
Figure 14:
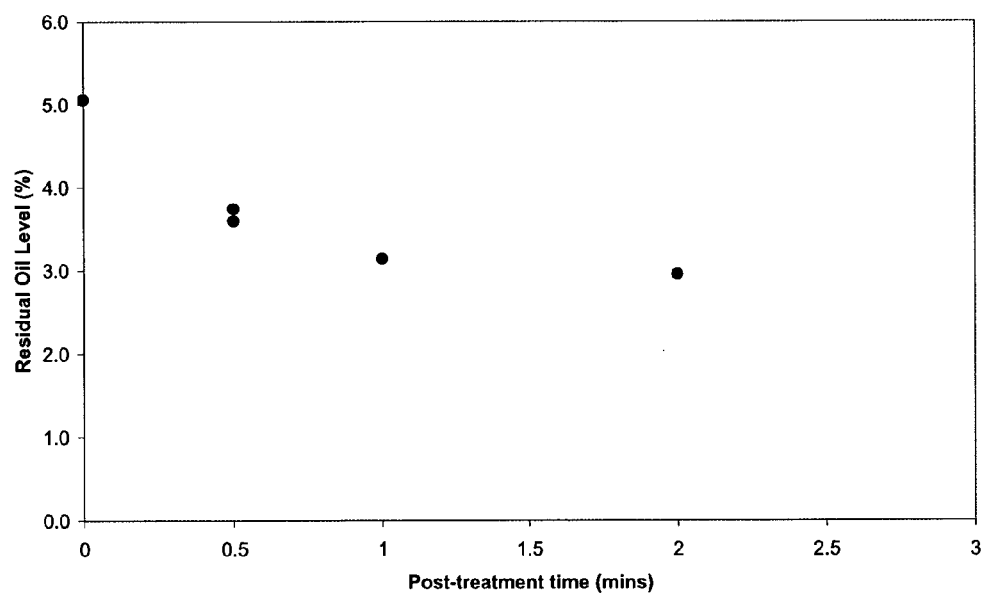
Figure 15:
Figure 16:
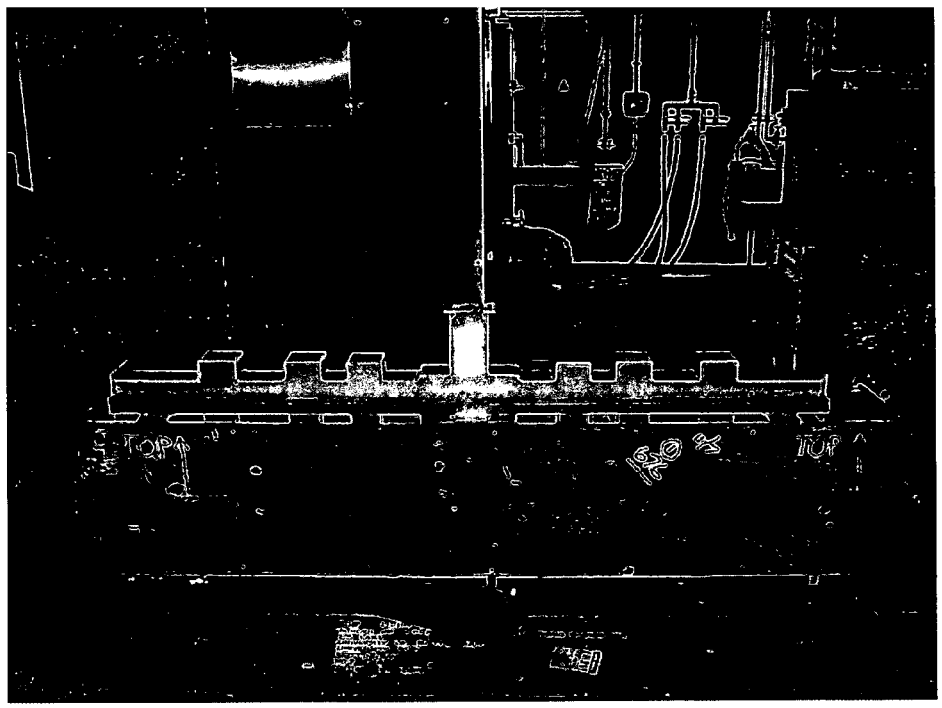
Figure 17:
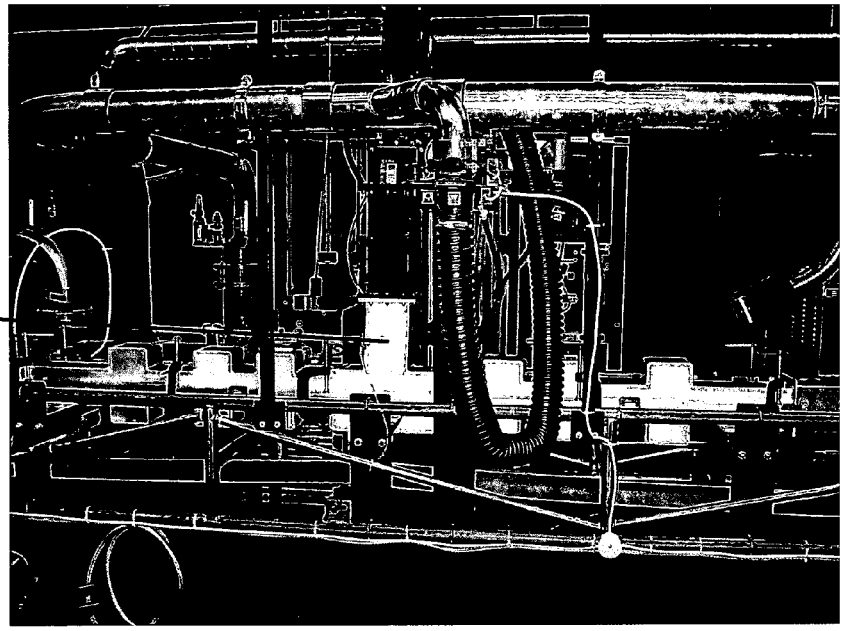
Figure 18:
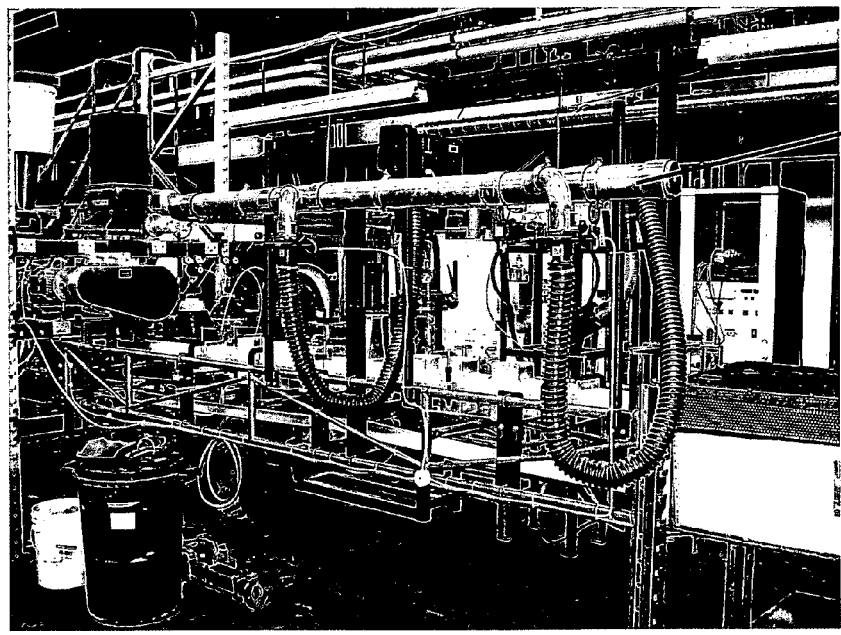
Figure 19:
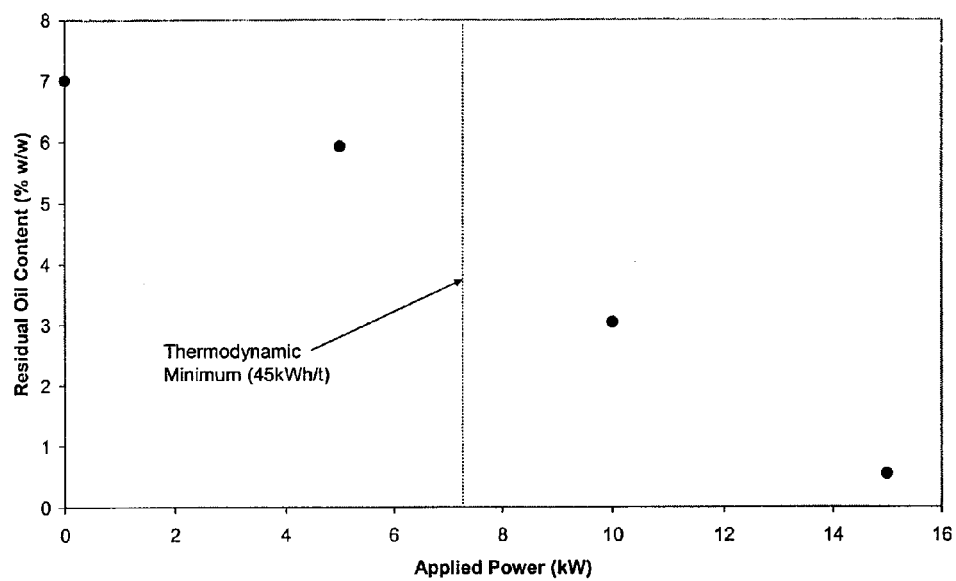
Figure 20:
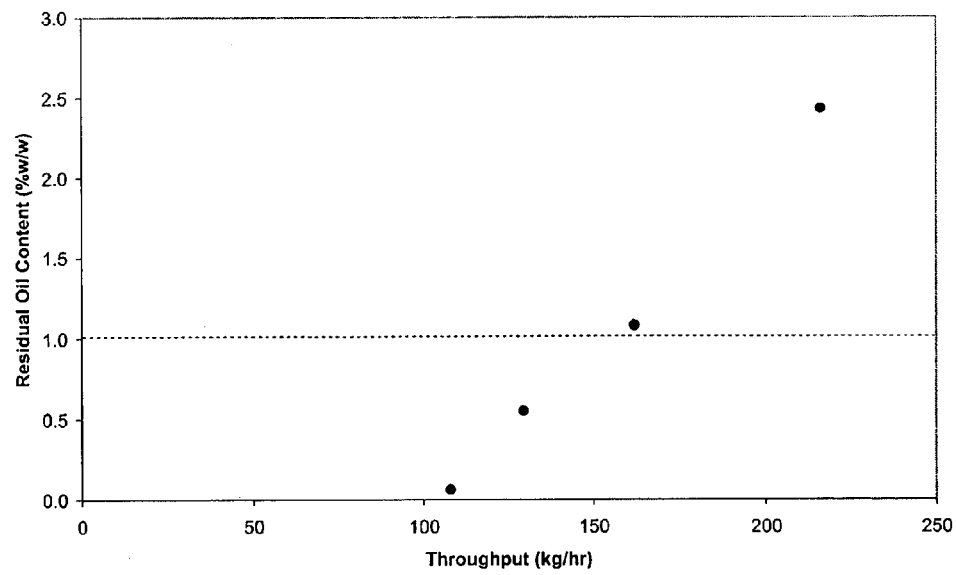
Figure 21:
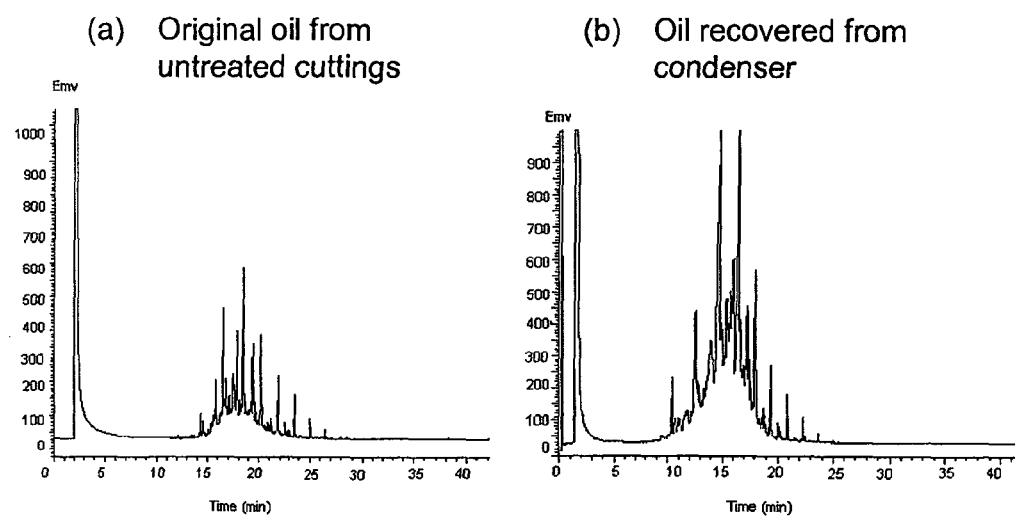
Figure 22:
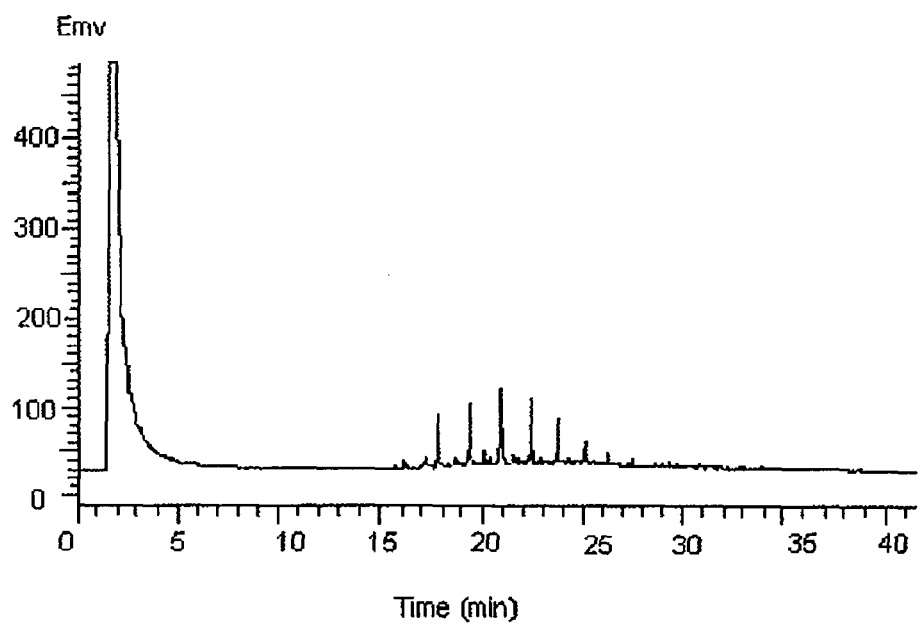
Figure 23:
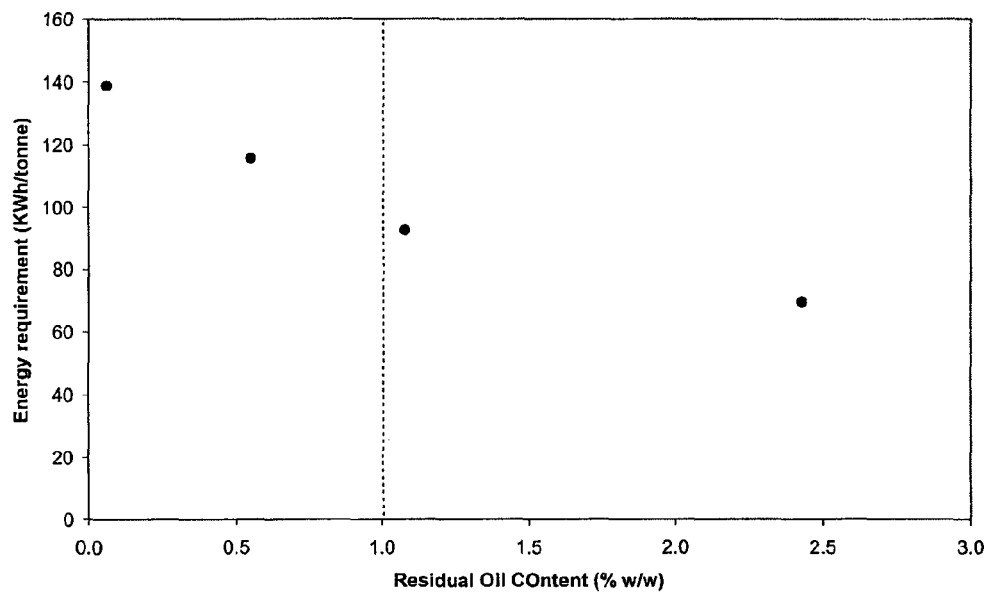
Figure 24:
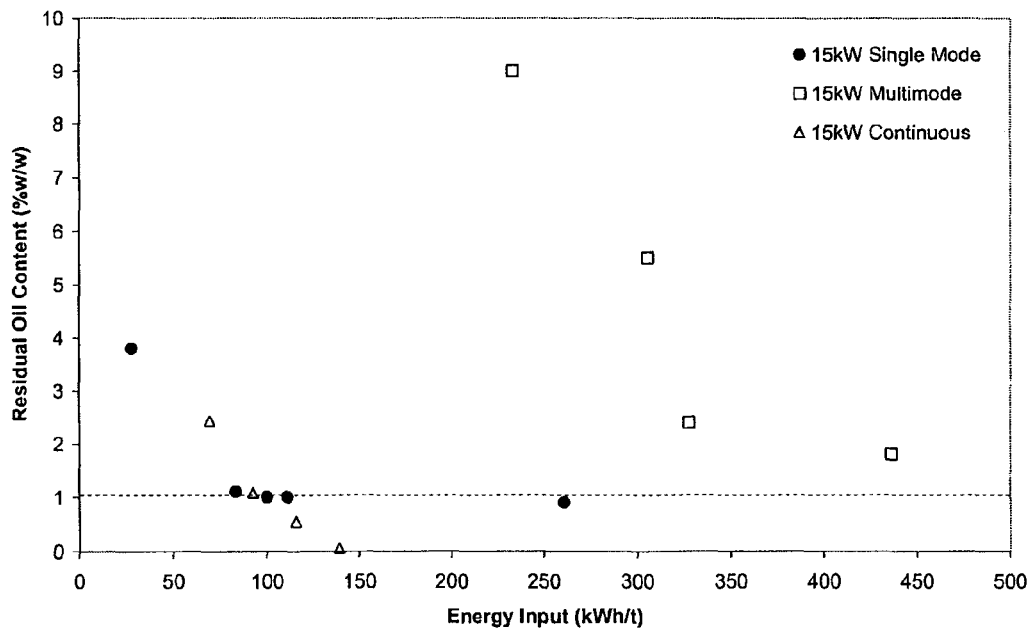

FIGS. 8a and 8b respectively show elevational drawings of a top portion and bottom portion of a laboratory scale microwave treatment cavity;

FIG. 9 is an illustration of the effects of tunnel and load heights on electric field distribution within the microwave cavity;

FIG. 10 shows (a) Electric field distribution (M/σ) and (b) dissipated power as a function of the belt radius;

FIG. 11 shows an embodiment of an optimised tunnel applicator;

FIG. 12 shows a layout of a gas handling system;

FIG. 13 shows the effect of steam stripping and microwave-enhanced steam stripping on oil removal from drill cuttings;

FIG. 14 shows residual oil levels obtained using gas stripping after microwave treatment;

FIGS. 15 and 16 show an embodiment of a microwave cavity;

FIGS. 17 and 18 show an embodiment of a gas handling system;

FIG. 19 shows residual oil content plotted against applied power for a constant throughput of 160 kg/hr in an exemplary system;

FIG. 20 shows residual oil content plotted against throughput for a constant applied power of 15 kw in the exemplary embodiment;

FIG. 21 shows gas chromatograms of (a) original oil from untreated drill cuttings and (b) recovered oil after microwave treatment;

FIG. 22 shows a gas chromatogram of residual oil extracted from treated drill cuttings;

FIG. 23 shows energy requirement as a function of the levels of remediation attained using an applied power of 15 kw; and FIG. 24 shows the variation of residual oil content with energy input for three processing scenarios (single mode batch, multimode batch, and continuous) utilising 15 kw of microwave power.

Figure 1:
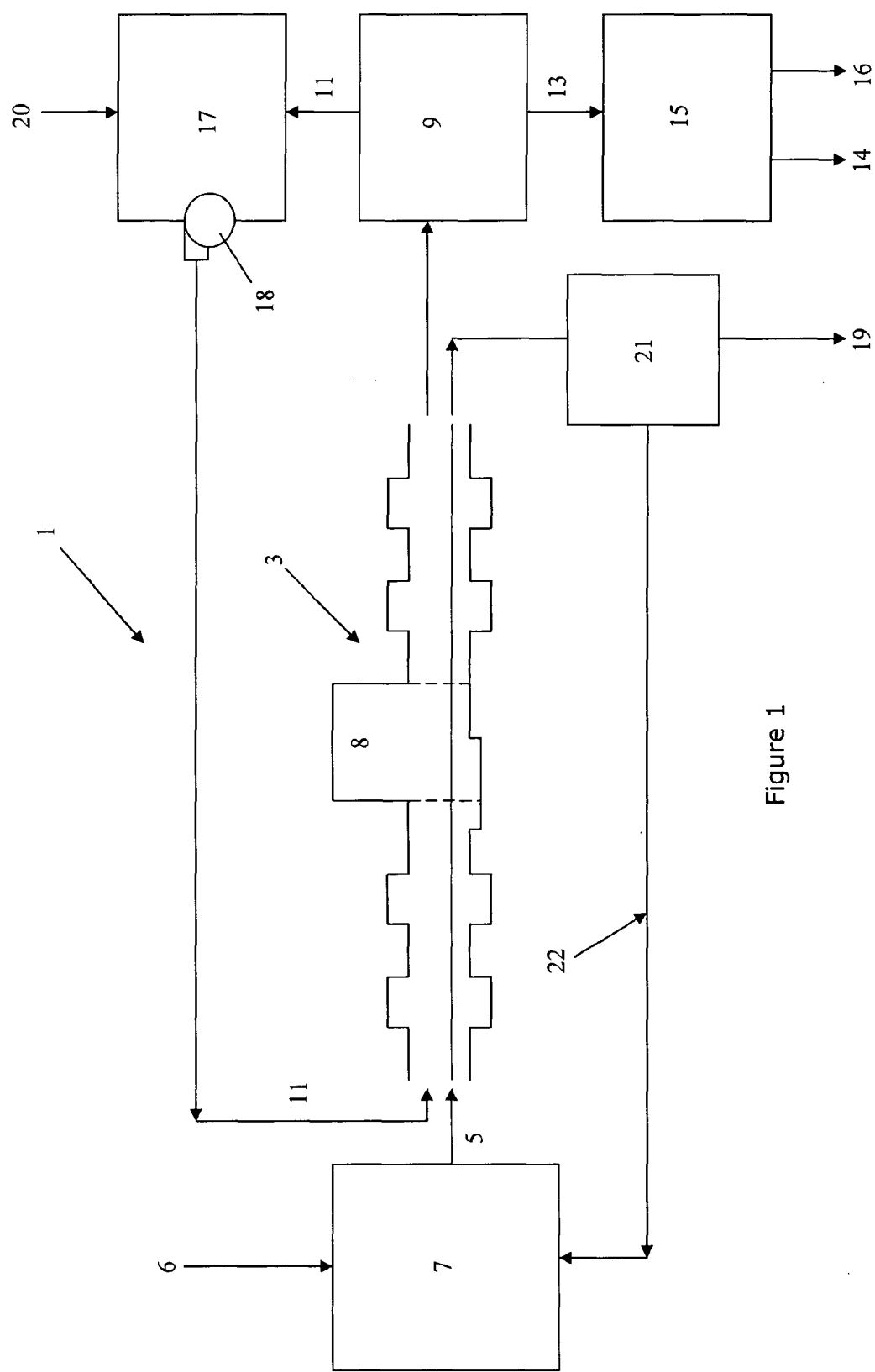
FIG. 1 is a schematic view of a continuous microwave treatment apparatus.

An overview of a system 1 for continuously separating oil from oil contaminated drill cuttings on an offshore oil/gas exploration rig is shown in FIG. 1. The system comprises feed means 7 (or a material feeder 7) for feeding a feed material 5 comprising untreated drill cuttings 6 (which comprise a mixture of water, oil and rock) into a microwave treatment cavity 3. Condensing means 9 is provided adjacent the outlet of cavity 3 and is arranged to separate an inert purging, or sweep, gas 11 from a recovered oil and water mixture 13. A separator 15 is provided to separate the mixture 13 into oil 14 and water 16. An extraction or recirculation system 17 is provided to filter and clean the gas 11 and to return it to the feed inlet 12 of the microwave cavity 3. The extraction system 17 comprises a pump 18 to pump the gas 11 through the cavity 3, and a clean gas inlet 20, for introducing new gas to the recirculated gas. A feedback system 21 is provided to feed treated cuttings 19 back to handling system 7 as dry, treated material 22.

In use, the feed material 5 is fed into cavity 3 on a conveyor 10, e.g. a conveyor belt. The feed material 5 is exposed to microwave radiation in a treatment area 8 (bounded by broken lines), which (as is described in more detail below) causes rapid and preferential heating of water within the feed material. This in turn causes thermal desorption of the oil component of the feed material, leaving substantially oil-free solid treated drill cuttings 19. The gas sweep 11 passing through the cavity 3 aids vapour removal to the condenser 9. Oil recovered by the condenser can be recycled into drilling mud (which may require the addition of some additives) whilst the treated solid material 19 is suitable for disposal (or for a feedback "dry" material 22 for blending back into the feed material 5 to control its water content—see later). Treated material has less than 1% by weight of material on the conveyor of oil and can be disposed of directly into the sea.

A throughput of 5 to 10 tonnes/hour can be achieved, but a throughput within the range of 250 kg/hour to 1 tonne/hour is satisfactory for most offshore rigs. These sorts of performance can be achieved with a microwave generator having a power of around 100 kW, with a power density of over 1 W/mm$^3$ ($10^9$ W/m$^3$). The system is small and compact, allowing it to fit easily onto a rig despite the restricted space. An industrial scale model could be simply freighted in an ISO freight container. The exact process footprint is variable as the system can be arranged in a large number of ways due to its modular nature, e.g. it could be arranged vertically with minimal use of a horizontal conveyor. The feed system could also be relatively far away from the treatment cavity. This flexibility makes it particularly useful on an offshore rig.

The composition of the feed material and the intensity and uniformity of the electromagnetic radiation (which depends at least in part on the shape of the microwave cavity itself), both influence the effective removal of oil. The feed material preparation and feed system 7 and the electromagnetic treatment cavity 3 are both engineered to ensure that contaminated material is consistently and uniformly treated. The means for the removal of evolved gases and vapours, optionally to allow those gases to be recovered and recycled is considered separately inventive.

Principles of the Treatment

The treatment method is based on the observation that if water within the material to be treated (e.g. water within the rocks of drill cuttings) is heated rapidly to steam then heat transfer mechanisms heat the oil contaminant resulting in thermal desorption of the oil. The water in the rocks is driven out of the rock and carries oil from the surface of the rocks as it goes. The by products of oil desorption escape from the treated material with the steam. Note that thermal desorption of oil is due to microwave heating of the water content of the drill cuttings. The oil is not directly heated itself by the microwave radiation (or this is not the effect relied upon).

How a material absorbs electromagnetic radiation depends on the dielectric properties of that material. The solid mineral phases of the drill cuttings generally do not possess dielectric properties that are conducive to microwave heating. The contaminating hydrocarbon phases are essentially transparent to the electromagnetic energy so these phases are not heated directly to a significant extent. However, water is a good absorber of electromagnetic energy, and particularly microwave energy. The main influence on dielectric properties of the drill cuttings is connected to the water content of the cuttings. In other materials than OCDC other properties might affect the dielectric properties as well as the water content. Properties include rock type, soil type, organic content, organic species, temperature, density, metal content and others. In addition, particle size influences the bulk properties of the material and may have an influence on the success of any treatment regime.

Liquid levels within a material to be treated are partly dependent on the mineralogy of the cuttings. Water can be present in a material to be treated in a number of forms that can be broadly defined as 'bound' and 'free'. 'Bound' water is contained within the rock fragments themselves, while 'free' water can be considered as external to the rock fragments. There is always at least some water present in drill cuttings as rocks are drilled well below the water table. The water is not usually seawater. Rapid heating of the water phase leads directly to the removal of contaminating hydrocarbon phases from the solid through a number of mechanisms:

(a) Steam-distillation: mixtures of oil and water, if well agitated such that both components are exposed to atmosphere, will boil at a temperature below the boiling point of either pure substance, in this case around 85° C. If no sweep gas (mentioned in more detail later), or if an inert sweep gas is used, the water is quickly removed as steam, and hence this mechanism cannot sustain itself beyond the initial stages of the treatment. However the use of steam rather than an inert gas (and as nitrogen or a noble gas) allows for continual renewal of the water and thus enables oil removal to continue at temperatures below its boiling point for the duration of the treatment.

(b) Stripping: steam from generated from water within the cuttings can act to strip the oil from the contaminated cuttings. Contaminating surface oil is literally 'blown off' the cuttings by escaping steam. This effect has been known to break rocks, although this is not the aim of the process. This effect can be improved by using a hot inert sweep gas, as the results in FIG. 13 show.

(c) Boiling: it will be shown that, even at low power, temperatures in excess of 250° C. are obtainable within the microwave cavity, which are sufficient for thermal desorption of all but the heaviest components of the oil. There may also be some superheating effects at higher powers, for example in chalk-based cuttings having a high level of bound water. It is known that the microwave absorbing properties of free and bound water are very different, with bound water absorbing increasing amounts of energy at higher temperatures.

Promoting cases (a) and (b) is of interest since they inherently require less microwave energy than (c). The water content is critical in driving the mechanism for oil removal.

Figure 2A:
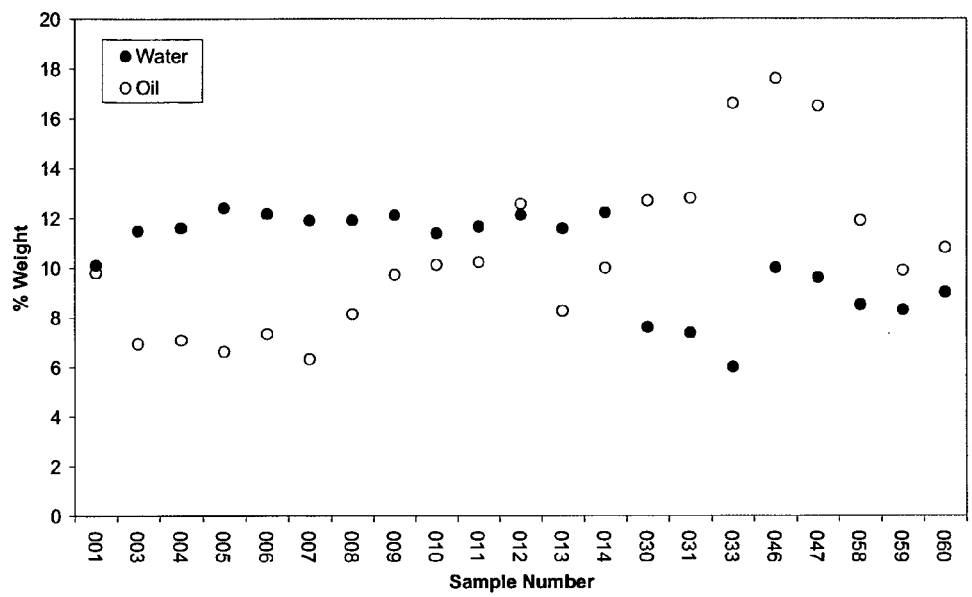
FIG. 2a shows the oil and water contents of a range of samples of drill cuttings.

Variability in feed material in terms of mineralogy, oil and water content means that a number of technical challenges must be overcome to develop an effective treatment system. Typical variability of water and oil concentration in drill cuttings is demonstrated in FIG. 2a. It can be seen that in this example water content in a sample can vary between approximately 13% and 5% by weight, and oil content varies even more widely between approximately 18% and 6% by weight. These percentages by weight were taken after the drill cuttings had been treated to remove excess oil, using a standard solvent extraction (DCM) procedure. The oil content is of obvious importance since this determines the quantity of oil that needs to be removed during the process, if the aim is to reduce the oil content to a low enough level to make it feasible to dispose of the rock cuttings without further treatment, e.g. by dumping the cleaned rock in the sea, or a landfill site, or using it in the construction industry (e.g. to make roads).

In addition, the cuttings can vary in physical appearance from soil-like to a viscous liquid depending on the liquid content and the particle size. The water content also impacts on the agglomerated particle size, thus impacting upon heat and mass transfer within a bed of cuttings.

Figure 2B:
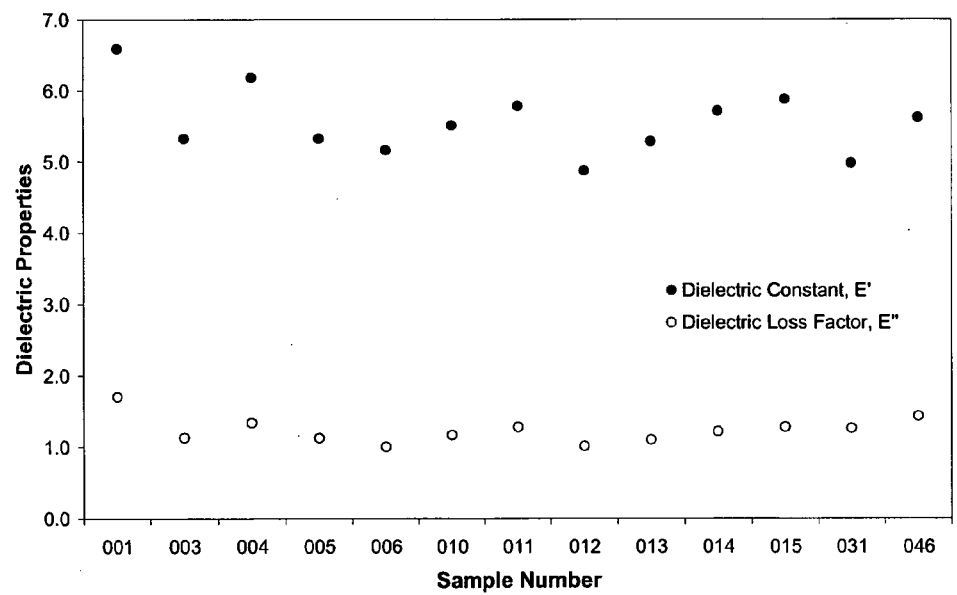
FIG. 2b shows the dielectric properties of selected drill cutting samples at 2.45 GHz and 20° C.

As previously explained, the dielectric properties of a material (in this case OCDC) relate to the ability of the material to absorb microwave energy. In OCDC water is the main microwave absorber, and so the water content (along with the electric field distribution) determines where microwave energy is dissipated within the sample and the extent to which the energy penetrates into its depth. FIG. 2b shows the measured dielectric properties of drill cuttings from a number of different samples. It can be seen that dielectric properties vary significantly from sample to sample.

Figure 3:
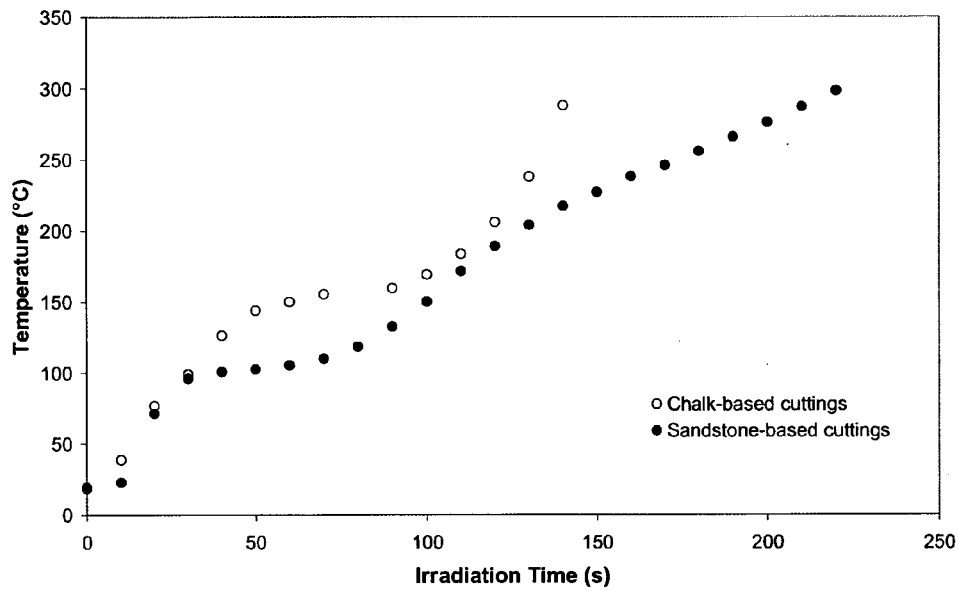
FIG. 3 shows the temperature of drill cuttings samples during microwave treatment in a multimode cavity at 1 kW. The maximum operating temperature of optical fibre thermocouples used to determine temperature was 300° C.

FIG. 3 shows the temperature of chalk and sandstone-based drill cuttings samples over time, during microwave treatment in a multimode cavity at 1 kW. The temperature/time profiles shown are non-linear, and are potentially very interesting. Although a thorough analysis of each region has not yet been conducted, there are a number of general conclusions that can be drawn from the data. Firstly, it is possible to superheat the water in the cuttings to form steam even at very low power levels such as 1 kW, a likely consequence of the very low thermal conductivity of the cuttings. Secondly, it can be seen that higher temperatures are achieved much more quickly with the chalk-based cuttings, which is likely to be due to the presence of bound water. Finally, it appears that temperatures far in excess of 300° C. might be achieved in a single mode cavity, which would result in thermal decomposition of the oil. The times taken to achieve temperatures sufficient to turn water to steam are relatively long in FIG. 3, as a result of the low power indication used.

The rate at which a material is heated depends on a number of factors, including the dielectric properties, and in particular the water content of the material itself, as well as on the power of the radiation that is being applied. The power absorption density per unit volume within a load is described by equation (1).

$$P_d = 2\pi f \epsilon_o \cdot \epsilon'' \cdot E_o^2 \quad (1)$$

where:
$P_d$ is the power density (watts/m$^3$)
f is the frequency of the applied energy (Hertz)
$\epsilon_o$ is the permittivity of free space (8.854×10$^{-12}$ F/m)
$\epsilon''$ is the dielectric loss factor of the material
$E_o$ is the magnitude of the electric field inside the material (volts/m)

It can be seen that power density is affected by $\epsilon''_r$ (material dielectric loss factor) and the frequency of radiation, as well as the magnitude of the electric field applied to the material. The water content of the OCDC significantly influences the dielectric loss factor and subsequently the power density/heating rate of the material. In order to design an effective and consistent process we have found it necessary to control the composition of the feed material, and to provide a microwave cavity having a shape suitable for irradiating a material of those known characteristics with a reasonably uniform field (to ensure that each portion of the feed material experiences a similar magnitude of applied electric field) for a given frequency of radiation. That is, we aim to ensure that the electric field within the cavity is reasonably uniform, to provide a reasonably uniform power density.

In the continuous microwave process described herein the field intensity is controlled to promote thermal desorption rather than pyrolysis so that the oil can be recovered and re-used.

Characteristics of the Feed System

We have come to realise that effective microwave treatment requires consistent feed material of specific and consistent properties. This is because the properties of the material being treated affect the structure of the electric field produced within the treatment cavity: the cavity is tuned to the material it is to treat.

As discussed above, the properties of drill cuttings vary widely between samples. In order to produce a consistent feed material we have realised that it is necessary to control the composition of untreated drill cuttings in some way. We do this by modifying the water content of the cuttings, by making a sample wetter or drier as necessary. In many embodiments only the water content need be controlled, as it is the water content that is most relevant to the dielectric properties of the feed material. But we do not exclude controlling other things as well.

Figure 4:
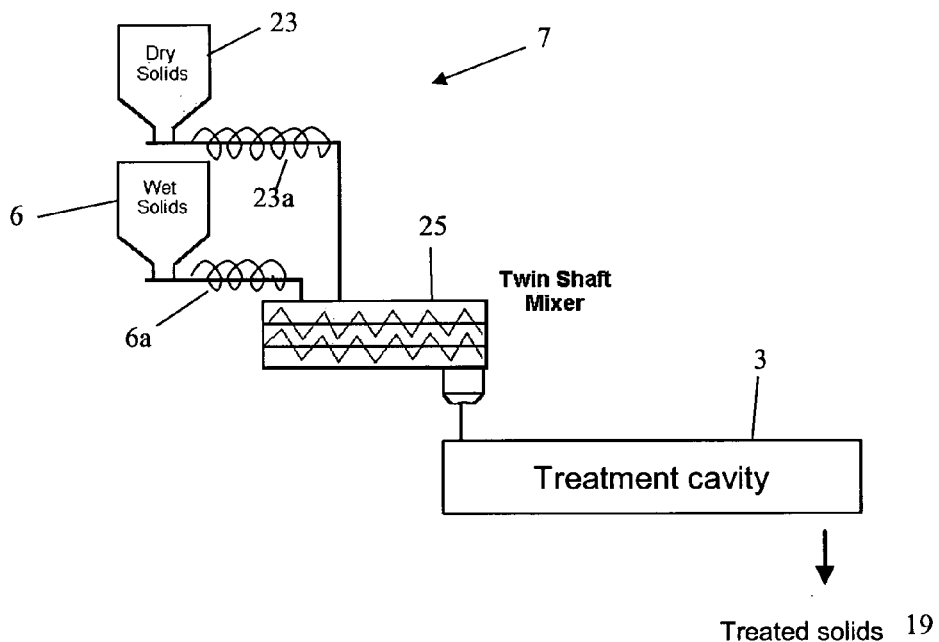
FIG. 4 is a schematic view of a feed material feeding system.

To make the liquid-like cuttings more amenable to microwave treatment dry material 23 is blended with the wet cuttings 6 to produce a crumble-like feed material. This is shown schematically in FIG. 4. The dry material is in fact treated cuttings 19, and the feed system 7 comprises a feedback means (shown schematically at 21 in FIG. 1) for recycling dry treated material into the dry material feed 23, as a mechanism to control the properties of the feed material to the system.

The water content of the untreated cuttings may be measured to assist in controlling the water content of the feed material. If desired, the water content of the treated cuttings may also be measured, although this is not necessary as treated cuttings generally have a low and fairly consistent water content. The feedback system may be arranged to adjust the amount of dry material blended into the wet cuttings based on the measured water content of those cuttings.

The plastic nature of the blended material means it cannot be stored in a static condition without causing deformation of the particles, loss of flowability and reduction of permeability. For this reason a continuous mixer 25 is used to make the process work reliably. A double-shaft paddle mixer can be used to blend and mix the two feed components. The mixture is introduced onto a conveyor (see FIG. 1) and carried into the microwave cavity 3 directly from the mixer 25. The drier, fed-back, material is mixed with the wetter, unmicrowaved, material to produce a feed material of substantially uniform bulk composition.

Two screw feeders 23a and 6a are used to control the flow feed rates of the wet and dry feed components. As well as impacting on the dielectric properties of the feed material, the ratio of wet/dry material in the feed material impacts upon the particle size, and hence the permeability of the feed material. By permeability, or porosity, we mean the ratio of the non-solid volume (pores and liquid) of the material to the total volume (including the solid and non-solid parts). High permeability for example, within the range of 0.3 to 0.6 of the drill cuttings, is beneficial to ensure the oil mist can be expelled from the material and removed through movement of the interstitial air.

A high permeability also helps to optimise mass transfer. A "crumble" type mixture is created by mixing the raw and dried drill cuttings, which produces agglomerated balls of the raw (wet) material surrounded by dry (treated) that achieves an easy flowing and highly gas permeable material with reasonably regular particle size.

Figure 5:
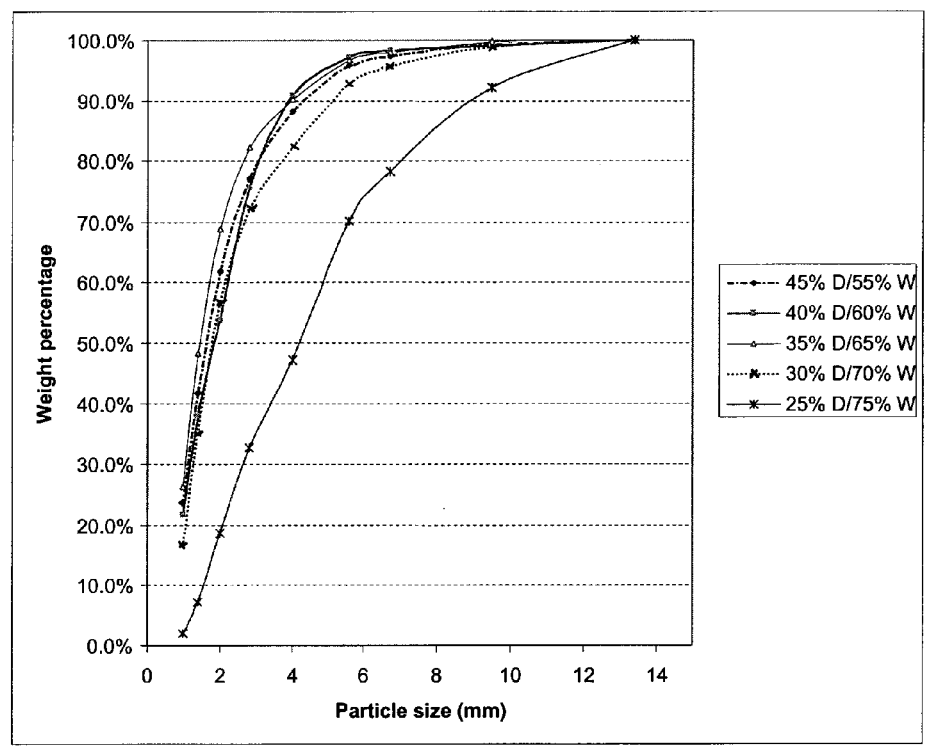
FIG. 5 shows example particle size distributions for different wet/dry compositions of feed material.

We have discovered that in many cases (but not all) a threshold 'dry fraction' exists, above which the particle size of the blended material is relatively consistent. In order to produce a blended feed which will be amenable to solids handling and microwave treatment, FIG. 5 demonstrates that a minimum of 30% dry material should be blended in with wet feed to ensure a feed material in which the majority of particles are of a similar size. The 30% is somewhat arbitrary based on the water and oil content of a particular single sample. If the feed is relatively dry, then no back blending would be required. If it is very wet then more blending would be required. The exact ratio of wet to dry cuttings will partly depend on the properties of the cuttings themselves. The optimum water content of feed material is 3 to 8%, for example 5%, by weight. However water contents in the range 1% to 15% may be acceptable in some circumstances.

The behaviour of the blended materials when treated with microwaves is equivalent to that of non-mixed cuttings, i.e. the distribution of liquids from the mixing of the wet and dry materials does not adversely affect the ability of the microwave process to remove the oil.

The sensitivity of the electromagnetic design of the cavity to the dielectric properties of the material justifies the approach to produce a consistent feed material, as both the mass flow rate through the system and the water content of the blended material affect the design of the magnetic cavity.

Features of the Microwave Treatment Cavity

The microwave cavity is designed taking into account the dielectric properties of both the feed material and the treated material, as well as the electric field strength required for the treatment of the material.

The rate of energy input to the material to be treated should be maximised, as it is necessary to convert water to steam as quickly as possible. This is achieved by passing a relatively small stream of material through a zone of, uniform, high electric field strength, resulting in the rapid heating of the water. By 'uniform', we mean a field of characteristics such that when a stream of material has passed through the field each particle within the stream received substantially the same electromagnetic treatment. That is, material passing through the cavity is substantially uniformly treated. It will be seen that the field itself does not necessarily have a uniform distribution within the treatment area. The strength of the electric field should be as high as possible, but not exceed the break down voltage in air. We have used radiation where the magnitude of the electric field portion is approximately $10^7$ V/m Water absorbs microwave radiation most efficiently when the radiation has a frequency in the order of 18 GHz. However, due to restrictions in the commercial use of microwave radiation, the only frequencies that are available for use in the UK are 2.45 GHz, 896 MHz and 433 MHz. We use 895 MHz, although systems using either 2.45 GHz or 433 MHz would also produce good results. The frequency of the electromagnetic radiation impacts on cavity design, as it impacts on the dimensions of the cavity that are needed to produce a relatively uniform field. From equation (1) it can be seen that frequency is directly proportional to power density, $P_d$ and frequency is directly proportional to 1/penetration depth. This implies that penetration of electromagnetic energy into thick beds of material requires lower frequencies. The precise frequency is dependant to some extent to the geographical region where the process is being operated. The total useable range extends from 1 MHz to 2.45 GHz, and it is laws and regulations that permit certain frequencies to be used, and prohibit the use of other frequencies, rather than technical necessity. As stated previously, RF, or other electromagnetic radiation, might be used rather than microwave.

It is envisaged that the residence time of the material in the treatment cavity (high field strength zone) would be from fractions of a second (such as $\frac{1}{10}^{th}$) to 1 or 10 seconds. The residence time in the treatment zone 8 is dependant on the conveyor belt speed. The throughput of the process is dependant, to some extent, on the dominant hydrocarbon removal mechanisms in the process (identified earlier). The residence time could even be less than 0.1 s, for example 0.05 second.

To achieve such residence times the electromagnetic power (microwave) applied should be in the range of 5 kW to approximately 2 MW. Higher powers result in more rapid heating of the water content of the feed material being treated.

Figure 6:
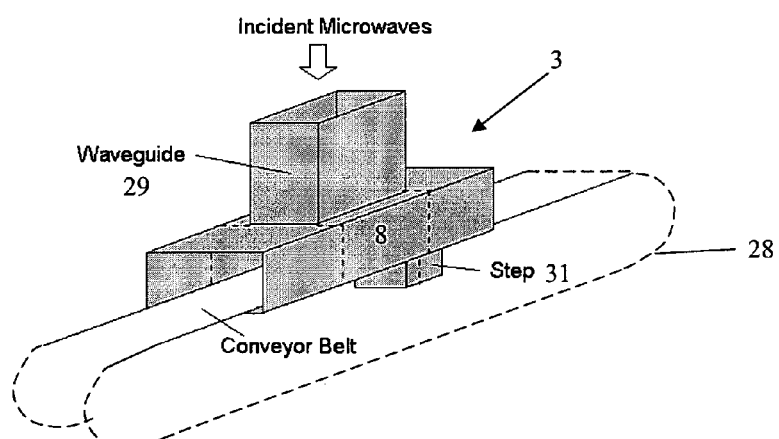
FIG. 6 is a schematic view of a tunnel applicator for continuous processing of drill cuttings.

A 'tunnel applicator' is shown schematically in FIG. 6. The apparatus comprise a microwave treatment cavity 3 having a waveguide 29 and a self-cancelling step 31. The step 31 is arranged to encourage the formation of a more uniform field within treatment zone 8, as is well known.

The 'tunnel' design allows a continuous process to be used, as a load can be fed into one end of the tunnel and out of the other, through treatment area 8. A trough belt 27 carries blended feed material into and out of the treatment cavity 3. The belt 27 is continuous and returns below the microwave cavity (shown schematically at 28). The belt material is such that it can withstand high temperatures, and is reasonably transparent to microwaves. The belt is supported on rollers (see FIG. 11), which are also reasonably transparent to microwaves. Hence substantially the only absorber of radiation within the cavity is the water within the material being treated.

The belt extends from the cavity on the downstream end for a distance sufficient to allow for vapour recovery, if necessary.

A trough-belt system is used as it provides many advantages over a flat belt system, which can have material handling problems such as load falling off the belt sides. The trough belt also provides the best option in terms of the uniformity of the electric field.

The cavity 3 is designed to result in the generation of a sufficient electric field strength and effective treatment zone 8, taking into account the properties of the feed material. If the field strength is too low then the energy will not be sufficient to turn the water rapidly into steam. If water is not rapidly heated to steam (for example, in less than 5 seconds) then the oil removal mechanisms described above do not work effectively. The microwave emitter may operate continuously, or may be pulsed; either term falls within the bounds of the term 'continuous' as used herein.

Features of the Electromagnetic Design

During cavity design, the prevention of localised areas of high field strength and the field uniformity were the parameters used to assess the feasibility of each simulated cavity. The field needs only to be sufficiently uniform to provide substantially uniform treatment. In addition, if the conveyor belt does not extend to the edges of the cavity the field need not be uniform beyond the edges of the belt. The exact cavity dimensions stem from an iterative simulation process in which the likely effectiveness of different cavity dimensions were assessed.

The following problems were encountered while conducting experiments in a $TE_{10n}$ single mode cavity. Different cavities were used, each with different dimensions.

Hot spots developed in within the cavity causing non-uniform treatment.

Smaller diameter loads gave more uniform treatment, but allowed less throughput. Large diameter loads allowed for greater throughput at the same power density, however requiring more power.

Figure 7:
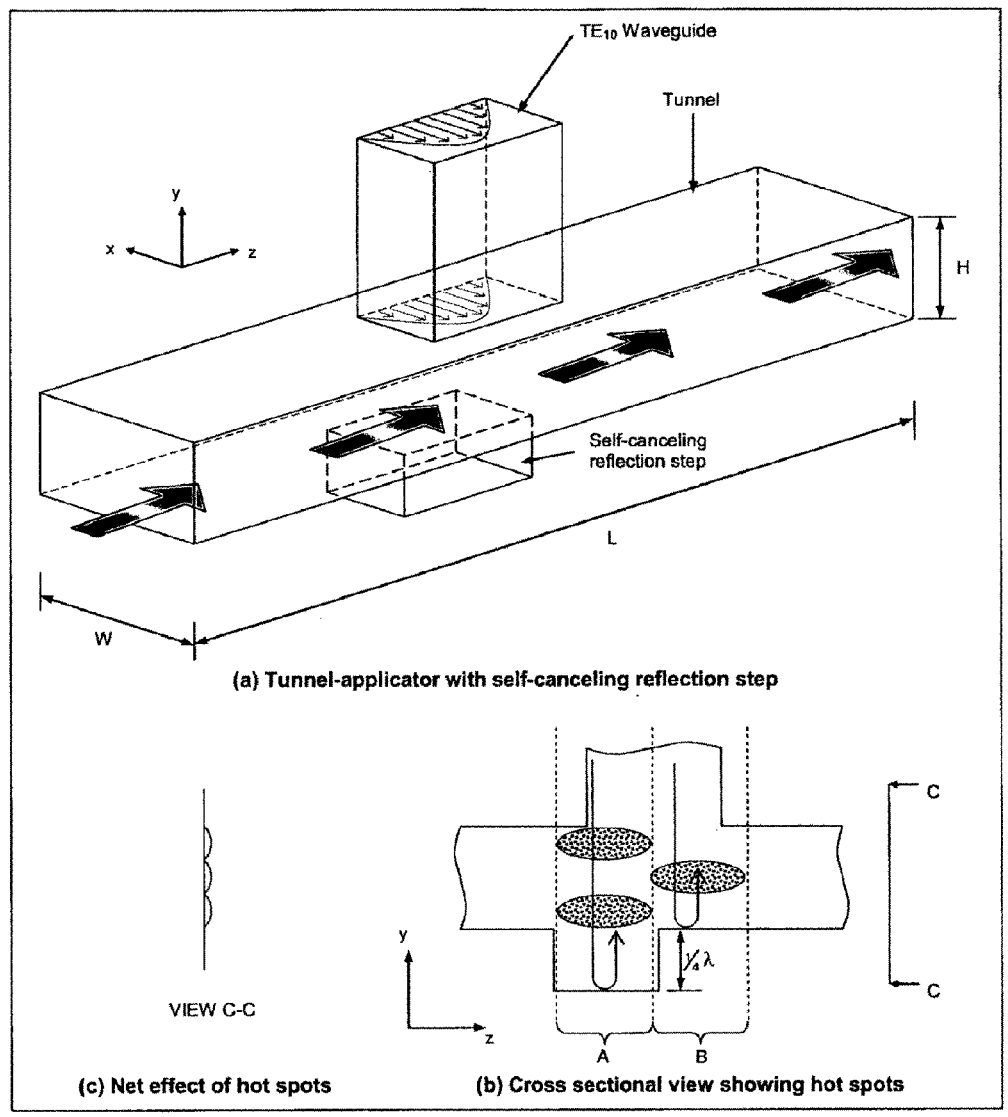
FIG. 7 is a schematic representation of a tunnel applicator, showing hot spots in the electric field.

The above problems could be resolved by eliminating the variation of the electric field in one dimension (see FIG. 7), in this case, the y direction perpendicular to the direction of material movement. This can be done using a rectangular tunnel applicator.

An existing tunnel applicator, used for the treatment of ore, was used to investigate the operation of a tunnel applicator during the treatment of oil contaminated drill cuttings. This tunnel had the following features:

It was fed orthogonally (i.e. perpendicularly to the direction of travel) with $TE_{10}$ waveguide such that the polarisation in the waveguide is perpendicular to the direction of material movement.

Variation in the electric field across the tunnel, in the x-direction, was eliminated by making the tunnel just the right width to obtain a single mode distribution.

Variation in the direction of material movement (z-direction) is not a major issue, since each particle should at some point encounter the same electric field strength.

The variation of concern (often the only variation of concern) is that perpendicular to the direction of travel (y-direction). Variation in this direction leads to non-uniform treatment of the sample as a result of the sample travelling through a hot spot.

The above design was improved by the addition of a self-cancelling reflection step to provide a more uniform field distribution in the vertical plane.

The step is a quarter of a wavelength deep, resulting in a total of half a wavelength being cancelled out in the step. Due to the reflection of the microwaves multiple hot spots are generated throughout the y-direction (FIG. 7(b)). The result is the net effect shown in FIG. 7(c), which is more uniform than what can be obtained without a step (which would be closer to the distribution in the area labelled 'B' in FIG. 7(c)). Given that the power in each of the regions A and B is high enough the electric field strength will be strong enough, resulting in uniform treatment of the sample moving through any one region in the z direction for a given residence time. Therefore, for a high power density, the residence time in each region should be relatively small. The field does not have to particularly uniform in the y-direction, as long as there is sufficient overlap between all of the hot spots, while in the x-direction then less than 10% variation would be desirable. It is important to note that this field uniformity relates to this type of design. A different cavity design might require different levels of uniformity.

After step optimisation, as described above, the following other factors must be considered:

Increasing the width of the cavity to a maximum whilst ensuring an even electric field distribution. A large width is desirable in order to allow a large throughput. However, to achieve an even field strength across the whole width (horizontal) the actual dimensions must be related to the frequency of the microwave energy. If the width were too wide then the field strength would fall away to zero at the extremes. Too narrow and we would not be able to pass a reasonable amount of material through the treatment zone.

Optimising the position of the belt relative to the cavity height

Assessing the sensitivity of the design to a change in feed properties (eg dielectric properties, particle size).

The cavity also is designed to maximise the headspace above the material being treated to aid removal of the vapours. As much headspace as possible is required, without compromising the power density. Build up of vapours within the system would result in oil and water deposition onto the internal surfaces of the treatment cavity, and possible damage to the cavity.

In addition there is a need to account for the effect of the belt radius (i.e. belt bending) in a trough conveyor belt and the cross-section of the drill cuttings on the belt.

A set of chokes, incorporated into the whole cavity design, prevents microwave leakage from the applicator from the inlet and outlet of the tunnel.

The cavity was designed for a feed material of particular dielectric properties. The median power density divided by the standard deviation was the key parameter used to differentiate each simulation based on its likely effectiveness. The properties chosen in the simulations represent an average for blended drill cuttings, based on the measurements taken of untreated drill cuttings, along with mixing laws and assumptions for the granulated materials. The simulations are based on a feed material having a dielectric constant $\in'=3.5$ and a dielectric loss factor $\in''=0.5$.

The optimum design yields field distributions where uniformity is obtained across the width of the cavity and multiple hot spots provide vertical uniformity. Even slight changes in the cavity dimensions or feed properties can result in a loss of the favourable field configurations as demonstrated in FIG. 9. The figure shows the areas of electric field strength within the cavity. Zone of high electric field strength appear in darker colours (hot spots). It can be seen that even changing the cavity configuration and load placement only slightly alters the distribution of the electric field.

Two potential embodiments were investigated in terms of optimising their electric field strength:
1. Belt runs along the bottom of the cavity
2. Belt runs above the bottom of the cavity, supported by microwave-transparent rollers FIG. 10 illustrates (a) Electric field distribution (M/σ) and (b) dissipated power as a function of the belt radius for both design cases for both cases.

If the belt would allow a rectangular cross-section of material to be formed inside the cavity then Case 1 (labelled as the improved ideal case design) offers the best performance. However, when the radius of the belt is taken into consideration the field uniformity is adversely affected (as shown by a marked decrease in M/σ, the median power density divided by the standard deviation), and design Case 2 is the one that should be adopted, as Case 2 tolerates the curvature of the belt in the corners, whereas the alternative design is not very robust in this respect. Of note is that the applied power assumed for the simulations is 0.5 W, which indicated that 95%+ of the forward power is dissipated within the material without any need for external tuning devices.

A perspective view of a laboratory scale tunnel applicator is shown in FIG. 8. The step 31 results in a number of areas of well-defined, very even and very high electric field strength by reflecting radiation input using the waveguide 29 in a well known manner. A conveyor belt (not shown) passes material through the field at a constant speed, such that the treatment is as even as possible, with no bias towards the centre or edges of the material on the belt.

The chokes 33 ensure that electromagnetic energy does not escape from the treatment cavity. These chokes are a function of the material in the tunnel and therefore the design of the cavity can be asymmetric to take account of the different material properties on the conveyor belt both pre and post treatment.

The laboratory scale cavity is approximately 2.2 m in length and 100 mm in width and height (excluding chokes and waveguide), and is capable of being operated to produce treated cuttings at a rate of 200 kg/hour. FIGS. 15 and 16 show photographs of this cavity. Dimensions of the cavity are given in FIGS. 8a (top section 3a) and 8b (bottom section 3b).

FIG. 11 shows an optimised tunnel applicator for the treatment of drill cuttings. for an industrial scale system. If the degree of sagging between the rollers adversely impacts on the field distribution, the rollers might be replaced with skid plates.

As explained above, the cavity has been optimised for specific material dielectric properties, and deviations from those properties in feed material would perturb the electric field irrespective of how careful the design. For this reason the feed material properties are carefully controlled by the feed unit 7. In addition, the height of material on the conveyor can be adjusted to remedy such variations provided that sufficient cross-sectional area is available for extraction of vapours.

Although the power density ($10^9$ W/m$^3$) is sufficient to remove oil and water without the aid of a sweep gas, a sweep gas is advantageous in the transportation of vapours away from the cavity, as described in more detail below.

Gas/Vapour Handling

We have found that the rate of oil removal is significantly improved when microwaves are applied in conjunction with a sweeping gas. For example, an inert gas such as nitrogen or steam, or other gas which will not react with the OCDC, is passed through the treatment cavity to assist in vapour removal during or shortly after. FIG. 13 compares the use of sweeping steam across cuttings to remove oil (steam stripping) with steam stripping in conjunction with microwave treatment. It can be seen that for a given treatment time the percentage of oil removed is at least 20% higher if sweeping steam is used as well compared with if stream stripping alone is used.

Any inert gas, such as nitrogen, could be employed as a sweep gas instead of steam. Similar results to those shown in FIG. 13 were obtained with nitrogen gas. It was found that gas stripping alone achieved only a 20% reduction in oil levels whereas the removal efficiency was in excess of 90% when microwaves were applied.

The microwave process could be used without a sweep gas, which would lessen the degree of design complexity of an industrial scale system. A study was performed whereby microwave energy was applied to a bed of drill cuttings for a set time. Nitrogen sweep gas was introduced to the bed of cuttings after the microwaves had been applied, i.e. the sweep gas passes through hot cuttings. FIG. 14 shows the results of this experiment, where the residual oil levels are shown against the time for which the sweep gas was applied after microwave treatment ceased.

Time zero in FIG. 14 corresponds to the application of microwaves only. It can be seen that increasing the length of time after treatment for which sweep gas is applied reduces the residual oil level in treated drill cuttings. It is evident therefore that sweep gas is beneficial to the overall separation process, but it does not necessarily need to be combined with the application of microwave energy. The bed of drill cuttings is a relatively poor heat conductor hence a significant quantity of the energy dissipated within the bed remains several minutes after the microwaves are applied. Clearly the continued evolution of volatiles after microwave treatment is significant, and should not be overlooked in the design of the continuous system, however the gas-solid contact achievable in batch laboratory experiments is difficult to achieve in a continuous process.

The continuous process can comprise of two distinct elements; a microwave application step followed by a gas sweeping step.

In the pilot scale process the sweep gas is inserted both at the materials input to the treatment cavity and along the electromagnetic waveguide (via an input in a side of the cavity (shown at 44 in FIG. 17). FIG. 18 shows the pilot scale gas handling system, 46. The input point at the waveguide ensures a positive gas pressure at this point and thereby reduces the potential for hydrocarbon and water phases to condense on the quartz window that acts as a barrier to stop potentially materials damaging the microwave generator. If water were to condense on the quartz window, then that water would heat up as microwaves are applied, and might cause the window to melt. The flow of gas down the waveguide also helps to overcome problems with arcing. The co-current flow allows for rapid removal of the vapours from the areas of high electric field strength.

A schematic gas handling system suitable for use in an industrial version of the process is shown in FIG. 12. The system can remove the oil and water vapours from the cavity, promote the continued evolution of vapours after microwave treatment and collect the oil and water for separation. Gas may be removed through perforations in a tunnel wall, such as the roof, as well as at the outlet, shown schematically at 40 in FIG. 12.

The gas handling systems are designed to be as flexible as possible, to allow the exact pressures and flows required in each practical situation to be determined experimentally for various operating conditions. New gas 20 can be added in to the recovered gas 11 at valve 42 if desired. An exhaust gas outlet 44 is provided.

A low pressure drop condenser is placed between the microwave treatment unit and a centrifugal fan to collect the oil and water vapours. With a thermal desorption mechanism the only gas discharged will be nitrogen, which can be recycled or purged.

If significant pyrolysis occurs in the treatment process then a gas scrubbing system can be incorporated.

EXAMPLE

An exemplary laboratory scale system similar to that shown in FIG. 1 will now be discussed.

Experimental and Materials

A continuous pilot-scale system consists of a 5-30 kW variable power microwave generator, which delivers microwaves at 2.45 GHz to a cavity via several sections of WR430 waveguide and an automatic E-H tuner. The tuner works by varying the geometry in the E and H planes to match the impedance of the microwaves with that of the cavity, with an algorithm used to vary the geometry so as to minimise the reflected power. Any reflected power is absorbed in a circulator, which uses a cold water load, and this protects the magnetron and power supply from excessive returned microwave energy. A stream of cold nitrogen was introduced at 2 l/min down the waveguide entrance to the cavity, which was done to provide a positive pressure and prevent oil and water vapours from passing through the waveguide to the microwave generator.

Drill cuttings are fed from a feed hopper into a twin shaft mixer, where dry material could be introduced to control the moisture content of the feed to the microwave cavity. The mixer deposits the cuttings onto a conveyor belt made from woven Nomex™ fibres (other flame resistant materials may be used), and formed into a trough to contain the process material. A heated nitrogen stream at 10 l/min was introduced at the material feed to act as a sweep gas, and also to provide an inert atmosphere within the cavity to prevent combustion of the oil vapour.

A top section of the cavity and chokes contains perforations which permit the withdrawal of evolved vapours whilst containing the microwave field. An extraction hood covers the perforated sections and the end of the choking section, and the vapours are drawn through a condenser to recover the oil and water. Dry drill cuttings are discharged at the end of the conveyor belt, and collected for analysis and disposal.

The oil and moisture contents of the treated and untreated drill cuttings were measured, and used to determine the degree of treatment. Water contents were measured using the Dean and Stark method (International standard ASTM D-95), which involves reflux distillation with toluene and separation of the water phase. Oil content measurement was carried out using solvent extraction, which is a technique for extracting organics from solid samples with liquid solvents. The organics were extracted using Dichloromethane (DCM) at elevated temperatures and pressures to increase the efficiency of the extraction process. Increased temperature accelerates the extraction kinetics, while elevated pressure keeps the solvent below its boiling point, thus enabling safe and rapid extractions. The hydrocarbon content of the organic phase was determined using Gas Chromatogram techniques.

The drill cuttings were obtained from North Sea drilling operations, and contained 10% oil and 10% water. Dry clay was added to reduce the oil and water content of the cuttings to 7%, which altered the consistency of the cuttings from a slurry to a more permeable, agglomerated granular material.

Continuous treatment tests were carried out over a period of several hours, with three samples of treated material taken for analysis for each set of experimental conditions. The recovered oil was collected at the end of the complete test sequence.

Results and Discussion

Effects of Microwave Power

Experiments were performed at power levels of 5, 10 and 15 kW with the material throughput fixed at 160 kg/hr. In all the tests the reflected power achieved a stable value between 0.5 and 0.7 kW. The bulk residual oil contents of the processed cuttings were measured, and these results are shown in FIG. 19, which shows the residual oil content plotted against power for a constant throughput of 160 kg/hr.

It can be seen that increasing the applied power results in improved oil removal, with the residual oil level decreasing steadily as the applied power is increased. Given that the reflected power remained relatively unchanged, almost all of the applied power was dissipated within the drill cuttings in the microwave cavity. It is known that the contaminant oil is effectively transparent to microwaves as it has a dielectric loss factor of less then 0.1 at room temperature and a frequency of 2.45 GHz. The effect of increasing the applied power is to increase the power density in the absorbing phases within the material, which is the water that is contained within the pore structure of the rock cuttings. Previous studies showed the remediation mechanism to be the rapid conversion of interstitial water to steam in the first instance, which then entrains the contaminant oil from the surface of the cuttings and into the sweep gas. This appears to be the most thermodynamically attractive mechanism as the microwave energy can be targeted into the water phase alone, rather than heating the entire matrix of rock fragments, oil and water.

It is possible to calculate the minimum energy required to remove the contaminant oil by assuming that all of the applied microwave energy raises the temperature of the water to 100° C. and subsequently overcome the latent heat of vaporisation. Based on the latent heat of water of 2000 kJ/kg and an average heat capacity of 4.2 kJ/kg·K, the minimum amount of energy required to convert all of the water to steam in a throughput of 160 kg/hr can be established, and this figure is 45 kWh per tonne of drill cuttings. An applied power of 7.3 kW is the theoretical minimum at this throughput, and it can be seen in FIG. 19 that power levels at or below 7.3 kW do not include significant levels of remediation, whereas at higher powers the residual oil levels are much lower.

The power levels required to reach the 1% environmental discharge threshold are approximately double the thermodynamic minimum, and this is likely to be due to the fact that some of the power is reflected, some goes into superheating the water above 100° C. before steam is formed, and some will inevitably be dissipated within the surrounding rock fragments and oil. Nonetheless, to desorb the oil by conventional heating uses much more energy because temperatures in excess of 250° C. are required, and the entire matrix of rock, oil and water must be heated to this temperature. The minimum energy requirements for a conventional heating process using the same feedstock as with this work are estimated in Table 1, assuming that al the oil vaporises at 250° C.

TABLE 1

Minimum energy requirements for a conventional heating process.

| Substance | Temperature Range °C. | Specific Heat Capacity kJ/kg·K | Latent Heat of Vaporisation kJ/kg | kg Substance per kg Cuttings | Energy Required kJ/kg cuttings | kWh/tonne |
|---|---|---|---|---|---|---|
| Rock Fragments | 20-250 | 2 | — | 0.86 | 395.6 | 109.9 |
| Oil | 20-250 | 2 | 800 | 0.07 | 88.2 | 24.5 |
| Water | 20-100 | 4.2 | 2000 | 0.07 | 163.5 | 45.4 |
| Steam | 100-250 | 1 | — | 0.07 | 10.5 | 2.9 |
|  |  |  |  |  | 657.8 | 182.7 |

On a theoretical basis the conventional thermal desorption process requires four times as much energy as the microwave treatment process.

Effect of Throughput

The throughput of drill cuttings was varied by changing the speed of the conveyor belt. The applied power was kept constant at 15 kW, and the throughput varied between 110 and 220 kg/hr. This correspond to belt speeds of 10-20 mm/s and residence times within the electric field of 5-10 seconds. The bulk residual oil content was determined for each set of conditions, and these results are shown in FIG. 20, which shows the residual oil content plotted against throughput for a constant applied power of 15 kW. The dotted line represents environmental discharge threshold of 1% oil on cuttings.

The trend in FIG. 20 shows that decreasing the throughput at constant power leads to a linear decrease in residual oil content, and hence improves the overall cuttings treatment process. Decreasing the throughput increases the residence time in the area of the cavity which supports the high intensity electric fields, which allows more of the available electromagnetic energy to be dissipated within the water phase. The environmental discharge threshold can be achieved using 15 kW and process throughputs below 150 kg/hr. Throughputs which are higher than this mean that the residence time in the electric field is too low for the creation of sufficient volumes of steam to remove the required levels of contaminant oil. When the process throughput is continually decreased below 150 kg/hr the residual oil levels reduce further, and can fall to below 0.1%, which is the current threshold for classification as a hazardous material in the UK. The reflected power levels were again found to be relatively constant across the range of throughputs studied, with values of 0.4-0.7 kW recorded. It is postulated that decreasing the throughput below 100 kg/hr at 15 kW will result in an increase in the reflected power as the residence time in the microwave cavity is likely to extend beyond that required to remove the water, meaning that the remaining cuttings effectively become microwave transparent. The electric field distribution is a strong function of the dielectric constant and dielectric loss factor of the process material. When the water is removed the dielectric loss factor decreases to below 0.1, meaning that much of the 15 kW of available microwave power will be transmitted through the material with very little being absorbed.

Quality of Recovered Oil

The base-oil in the drilling mud was characterised using Gas Chromatography. The oil and water recovered from the condenser were collected and the two phases allowed to separate under gravity. Three samples of the oil phase were removed for analysis, and typical results are shown in FIG. 21, which shows Gas Chromatograms of (a) original oil from untreated drill cuttings and (b) recovered oil after microwave treatment.

The peaks shown in the chromatogram in FIG. 21a indicate an abundance of C8-C16 hydrocarbons, with small traces of C17-C20 at longer elution times. In FIG. 21b, the chromatogram of the recovered oil indicates the presence of some lighter hydrocarbons than were evident in the original oil, and less of the heavier hydrocarbons. Overall the composition is similar, and is not likely to have a significant impact on the oil properties for recycling within the drilling mud system. Nonetheless the presence of lighter hydrocarbons indicates that some thermal upgrading of the oil has occurred, possibly due to pyrolysis or steam cracking caused by localised areas of peak electric field strength within the cavity. Analysis of the residual oil in the treated drill cuttings was also carried out and this shows greater abundance of the heavier species, which is shown in the chromatogram in FIG. 22.

Energy Requirements

The levels of remediation achieved were evaluated against the total microwave energy applied to the system, and this is shown in FIG. 23, which plots energy requirement as a function of the levels of remediation attained using an applied power of 15 kW.

Applying more microwave energy leads to an improvement in the remediation process as the residual oil content decreases with increasing energy input. In this case the 1% environmental discharge limit can be achieved using around 100 kWh per tonne of drill cuttings. Significantly cleaner cuttings can be produced at higher energy inputs of the order of 140 kWh per tonne, which correspond to longer residence times within the microwave field.

The results shown in FIGS. 19 and 20 indicate that both higher applied powers and longer residence times in the microwave field are beneficial to the remediation process. The results obtained do not allow the effects of heating rate to be established, since tests would need to be evaluated using different power densities at equivalent energy inputs. For example, it is not possible to determine whether a high power and short residence time is better than a low power and a long residence time. The effect of power density can be evaluated by comparing the results of the continuous testwork with those obtained from batch microwave experiments in single mode and multimode cavities.

Comparison with Batch Processing

Batch tests have previously been carried out using single mode and multimode apparatus. These batch processes were compared with the continuous process described herein. In all cases the applied power was 15 kW, and the residence time or treatment time was varied. The results are shown in FIG. 24, where the three cavities are compared based on the microwave energy used in each case.

FIG. 24 shows the variation of residual oil content with energy input for three processing scenarios utilising 15 kW of microwave power.

All three microwave cavities are able to induce significant levels of remediation of the contaminated drill cuttings. The cavity which supports the lowest power density is the multimode cavity, and it can be seen from FIG. 24 that the energy requirements are of the order of 450 kWh per tonne to reduce the oil content to 2%. The tests in the multimode cavity showed that the 1% discharge threshold is difficult to achieve, and our previous work also supports this observation. A summary of the experimental conditions used is shown in Table 2, along with the power densities which are supported in each of the three different cavities.

TABLE 2

Power densities in multimode, single mode and continuous microwave applicators.

| Processing Strategy | Multimode | Single Mode | Continuous |
|---|---|---|---|
| Applied Power (kW) | 15 | 15 | 15 |
| Throughput (kg/hr) | — | — | 160 |
| Sample Volume (cm$^3$) | 100 | 100 | — |
| Mean Power Density (W/m$^3$) | $4 \times 10^6$ | $7.5 \times 10^7$ | $1.4 \times 10^8$ |

The results obtained with the single mode cavity showed that the 1% discharge threshold could be achieved, and that the remediation process occurs using lower energy inputs than were evident in the multimode cavity. This is because the single mode cavity supports a power density which is an order of magnitude higher than that in the multimode cavity (see Table 2), and this leads to an increased heating rate. The microwave power is dissipated within the water phase, causing superheating of the water and rapid conversion into steam. At lower power densities the heating rate is proportionately lower, meaning that the beneficial effects of rapid steam formation are reduced due to heat transfer losses and recondensation of some of the steam before it can act as an entraining gas.

The average power density supported by the continuous system is $1.4 \times 10^8$ W/m$^3$, which is approximately double that supported by the single mode cavity. It can be seen in FIG. 24 that the effect of energy input on oil removal with the two cavities is roughly comparable up to the 1% threshold, but the continuous cavity allows much lower levels of residual oil to be achieved. The single mode treatment is a batch process, and the dielectric constant and loss factor of the drill cuttings decrease with time as water is lost. At low oil levels there is a correspondingly small amount of water within the sample, and its dielectric loss factor is low. This means that it is difficult to concentrate sufficient microwave energy into the sample, and results in a high reflected power towards the end of the batch test. This was observed in practice, with over 80% of the applied power reflected at the end of the single mode test, which corresponds to less than 3 kW of power absorbed. It is thought that the increasing reflected power during the tests accounts for inability of the single mode treatment to remediate the drill cuttings to levels significantly below 1% oil.

Although embodiments of the invention have been described in relation to OCDC, it will be appreciated that the invention is equally applicable to removing oil from other contaminated matrices, such as soil. The invention may be used to recondition brownfield/ex-industrial sites or reduce pollution on beaches after an oil spill, or remove oil from processed hydrocarbon containing materials.

The treatment described herein can be used to remove a broad range of organic species such as benzene, diesel, and kerosene derivatives as well as hydrocarbons. The treatment system will work very effectively for hydrocarbons up to diesel and kerosene, or similar molecules, and will work to a lesser extent for heavier species.

Although we have talked about removing contaminants, such as oil, typically from the surface of solid material such as stone, the invention is not necessarily limited to removing contaminants. The material to be driven off may have always been present—the invention could be used to separate a materials susceptible to separation in this way. The invention may be used to obtain either the driven off material, or the material that is left behind. For example, the invention could be used to obtain a material driven from a substrate by water to steam expansion, for example oil may be obtained from shale in this way.

The invention claimed is:

1. A method for separating a hydrocarbon content from a hydrocarbon contaminated matrix, comprising the steps of:
    controlling water content in a feed material comprising the hydrocarbon contaminated matrix wherein the water content of the feed material is controlled by blending a material of known water content with the hydrocarbon contaminated matrix;
    continuously conveying the feed material into a treatment cavity;
    exposing the feed material in a treatment area of the treatment cavity to microwave radiation arranged to cause rapid heating of at least a portion of the water content to form steam, wherein the rapid steam formation results in thermal desorption of at least a portion of the hydrocarbon content from the matrix; and
    continuously removing the treated matrix from the treatment cavity;
    wherein the microwave radiation has a frequency in the range 10MHz to 10GHz.

2. A method according to claim 1 further comprising the step of measuring a water content of the hydrocarbon contaminated matrix, or of the bulk feed material.

3. A method according to claim 1 wherein the material of known water content comprises treated matrix.

4. A method according to claim 3 wherein the water content of the feed material is controlled such that the dielectric properties of the feed material as a bulk composite substance are in the range from the group:
    (i) $\epsilon'$=0.1 to 20 and $\epsilon''$=0.25 to 0.75;
    (ii) $\epsilon'$=2.5 to 4.5 and $\epsilon''$=0.25 to 0.75; and
    (iii) $\epsilon'$=3.5 and $\epsilon''$=0.5.

5. A method according to claim 1 wherein the microwave radiation has a power in a range from the group:
    (i) 5 kW to 20 MW, and
    (ii) about 1 MW.

6. A method according to claim 1 further comprising the step of passing or sweeping inert gas though the treatment cavity substantially to remove vapours from the treatment area, the vapours having been produced during exposure of the feed material to the microwave radiation.

7. A process for producing oil or gas comprising finding an oil or gas field or pocket by test drilling using a drilling platform and subsequently extracting oil or gas from the field or pocket, wherein the test drilling comprises drilling with an oil based drilling mud and treating oil contaminated drilling cuttings in situ at the drilling platform by using the method of claim 1.

8. A method according to claim 1 wherein the feed material is exposed to the microwave radiation for a length of time from the group:
    up to about 10 seconds;
    (ii) 0.1 to 10 seconds;
    (iii) 0.1 to 2 seconds.

9. A method for reducing a hydrocarbon content of a hydrocarbon contaminated matrix, comprising the steps of:
    controlling dielectric properties of a feed material comprising the hydrocarbon contaminated matrix;
    continuously conveying the feed material into a treatment cavity;
    exposing the feed material in a treatment area of the treatment cavity to microwave radiation arranged to cause rapid heating of at least a portion of a water content of the feed material to form steam, wherein the rapid steam formation results in thermal desorption of at least a portion of the hydrocarbon content from the matrix; and
    continuously removing the treated matrix from the treatment cavity;
    wherein the microwave radiation has a frequency in the range 10 MHz to 10 GHz.

10. A method according to claim 9 wherein controlling the dielectric properties comprises controlling a water content.

11. A method according to claim 9 comprising the step of measuring at least one of a water content and an average size of particles of the feed material.

12. A method according to claim 11 comprising the step of altering the measured water content and/or particle size.

13. An apparatus for separating a hydrocarbon content from a hydrocarbon contaminated matrix, the apparatus comprising:
    a microwave treatment cavity having a material treatment area;
    a material feeder arranged in rise continuously to convey a feed material to and out of the treatment area;
    a material blender arranged to mix additional material into the hydrocarbon contaminated material to produce a. feed material of controlled water content; and
    a microwave emitter arranged in use to expose feed material in the treatment area to microwave radiation in order to cause rapid heating of at least a portion of a water content of the hydrocarbon contaminated matrix to form steam, so as to remove at least a portion of the hydrocarbon content from the matrix;
    wherein the microwave radiation has a frequency in the range 10MHz to 10GHz.

14. An apparatus as claimed in claim 13 further comprising a gas circulation mechanism arranged in use to pass inert gas through the treatment area wherein the gas circulation mechanism circulates inert gas through the treatment area and recovers and recirculates the inert gas.

15. An apparatus as claimed in claim 14 wherein the gas circulation mechanism is arranged to remove gas from the tunnel applicator through perforations in a wall of the tunnel applicator.

16. An apparatus according to claim 13 having a flow rate of feed material of at least 50 kg per hour and a power density of at least $10^9$ W/m$^3$ in a heated phase of the material in a material treatment z and wherein the apparatus comprises a continuous feed tunnel microwave applicator of height at least 1.00 mm and width at least 100 mm.

17. An apparatus as claimed in claim 13 wherein the additional material comprises treated material.

18. An apparatus as claimed in claim 13 wherein the treatment cavity comprises a tunnel applicator having an inlet and an outlet, and treatment is located between the inlet and the outlet, and a waveguide arranged to direct microwave radiation from the microwave emitting means into the treatment area; and wherein the shape of the tunnel applicator is arranged to improve the uniformity of an electric field which is formed within the treatment area when the apparatus is in use treating a material having bulk dielectric properties in a range $\in'$=0.1 to 20 and $\in''$=0.25 to 0.75.

19. An apparatus as claimed in 18 wherein the tunnel applicator comprises a component from the group:
  (i) a self cancelling step; and
  (ii) chokes arranged to resist the escape of microwave radiation from the inlet and outlet.

20. Apparatus as claimed in claim 18 further comprising a separator or adapted to separate at least some vapour produced in the treatment area from the inert gas.

* * * * *

UNITED STATES PATENT AND TRADEMARK OFFICE
CERTIFICATE OF CORRECTION

PATENT NO. : 8,789,583 B2  Page 1 of 1
APPLICATION NO. : 12/514983
DATED : July 29, 2014
INVENTOR(S) : Robinson et al.

It is certified that error appears in the above-identified patent and that said Letters Patent is hereby corrected as shown below:

In the claims

Column 22, line 52, claim 13, the word "use" should replace the word "rise"

Column 22, line 55, claim 13, the "." should be deleted after the "a"

Column 23, line 10, claim 16, the word "zone" should replace the letter "z"

Signed and Sealed this
Ninth Day of December, 2014

Michelle K. Lee
*Deputy Director of the United States Patent and Trademark Office*